(12) United States Patent
Gifford et al.

(10) Patent No.: US 9,747,482 B2
(45) Date of Patent: Aug. 29, 2017

(54) AIMER ACCESSORY FOR CAPTURING A CODED IMAGE

(71) Applicant: COGNEX CORPORATION, Natick, MA (US)

(72) Inventors: Micheal Gifford, San Leandro, CA (US); David James Stein, Purlear, NC (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 14/682,072

(22) Filed: Apr. 8, 2015

(65) Prior Publication Data

US 2016/0300090 A1 Oct. 13, 2016

(51) Int. Cl.
*G06K 5/04* (2006.01)
*G06K 7/10* (2006.01)
*G06K 7/14* (2006.01)

(52) U.S. Cl.
CPC ..... *G06K 7/10732* (2013.01); *G06K 7/10831* (2013.01); *G06K 7/1443* (2013.01)

(58) Field of Classification Search
CPC .... G06F 1/1635; G06K 7/0004; G06K 7/089; G06K 7/10722; G06K 7/10732; G06K 7/10752; G06K 7/10811; G06K 7/10881; G06K 7/10831; G06K 7/1443
USPC ..... 235/462.24, 454, 462.08, 462.28, 462.45
See application file for complete search history.

(56) References Cited

U.S. PATENT DOCUMENTS

| | | | |
|---|---|---|---|
| 8,346,979 | B1 | 1/2013 | Lee |
| 8,832,323 | B2 | 9/2014 | Lee |
| 9,107,484 | B2 | 8/2015 | Chaney |
| 9,110,355 | B1 | 8/2015 | Nourbakhsh |
| 2010/0134679 | A1* | 6/2010 | Lin ................ H04N 5/2354 348/371 |
| 2013/0013813 | A1 | 1/2013 | Lee |
| 2013/0109316 | A1 | 5/2013 | Lee |
| 2014/0071547 | A1 | 3/2014 | O'Neill et al. |
| 2014/0078594 | A1 | 3/2014 | Springer |

(Continued)

FOREIGN PATENT DOCUMENTS

EP 2500758 A1 9/2012

OTHER PUBLICATIONS

Webpage: http://www.scandit.com/products/case/; 6 pages; download date Jan. 4, 2017.

(Continued)

*Primary Examiner* — Seung Lee
(74) *Attorney, Agent, or Firm* — Quarles & Brady LLP

(57) ABSTRACT

An aimer accessory for a mobile device and method of use is provided. The accessory includes a body configured for being affixed to the mobile device. The body includes a collimator terminating with a grating disposed in a distal portion thereof. The grating is configured to receive light from a lamp of the mobile device and to generate a light pattern on the surface containing a barcode. Registration of the light pattern and the barcode in a scan area enhances the ability of the mobile device to capture a barcode image. Registration may be configured for blind or target mode scanning. In blind mode, the registration occurs on detection of the light pattern and barcode in a viewing angle of a camera of the mobile device. In target mode, the registration occurs on a detection of the light pattern hovering over the barcode in a viewing angle of the camera.

20 Claims, 23 Drawing Sheets

(56) References Cited

U.S. PATENT DOCUMENTS

| | | |
|---|---|---|
| 2015/0199549 A1* | 7/2015 | Lei .................... G06K 7/10811 235/462.24 |
| 2015/0220766 A1 | 8/2015 | Russell et al. |
| 2015/0254485 A1* | 9/2015 | Feng ................... H04M 1/0202 455/556.1 |
| 2015/0356336 A1* | 12/2015 | Hoobler ................ G06K 7/089 235/455 |
| 2016/0188940 A1 | 6/2016 | Lu et al. |
| 2016/0209735 A1 | 7/2016 | Anderson |
| 2016/0232389 A1 | 8/2016 | Gifford |
| 2016/0292477 A1 | 10/2016 | Bidwell |

OTHER PUBLICATIONS

European Patent Office, Extended European Search Report, Application No. 16164426.5, dated Aug. 17, 2016.

\* cited by examiner

FRONT

BACK

PDF417

| | |
|---|---|
| Codabar | PDF417 |
| Code 11 | Aztec Code |
| Code 93 | QR code |
| Other | Other |

Fig. 8

AIMER ACCESSORY FOR CAPTURING A CODED IMAGE

BACKGROUND OF THE INVENTION

1. Field of the Invention

The present invention relates to devices for optically acquiring data, and in particular, to optical barcode scanning devices.

2. Description of the Related Art

Handheld image and barcode scanning devices are well known and used in a wide range of enterprise applications. Barcode scanners are regularly used in connection with checkout stations at supermarkets and other retail establishments for reading barcodes on consumer goods. They are also useful in inventory collection and control for warehousing, shipping and storage of products.

Mobile electronic devices, such as smartphones and tablet computers, are well known and leveraged in a wide range of corporate and personal applications. Such devices, executing specialized software, are frequently being utilized to scan and decode barcodes on products, promotions, and coupons. The specialized software, or app, is typically downloaded to the device but may be preloaded. The app configures the smartphone or mobile device to use the built-in camera in the smartphone or mobile device to scan barcodes, such as those found on products or in magazines, stores, websites, and billboards.

Today's enterprise and personal workplace is changing. Technology is becoming more integrated with daily processes and procedures. In a mobile workplace, the mobile electronic device may provide a more cost effective and flexible alternative to traditional, dedicated and purpose-built handheld scanning devices.

However, scanning a barcode with a smartphone or other mobile electronic device can be cumbersome. To scan a barcode, the user is typically required to view the barcode through the display screen of the device in order to aim and focus the camera lens before the barcode can be successfully decoded. If the device's camera is not properly aimed and focused, it may be difficult or impossible to read the barcode, or may take an excessive amount of time to capture, detect, and decode the barcode from an image. As a result, the scanning of barcodes using a mobile electronic device is inefficient whenever there is a need for convenient, rapid, or high volume barcode detection and decoding. Improving the efficiency and ease-of-use of barcode scanning, using the built-in camera along with enhanced decoding software, is desirable.

Thus, methods and devices are needed to improve the efficiency and ease-of-use of scanning a barcode using a mobile device, such as a smartphone.

SUMMARY OF THE INVENTION

Technologies are described for optical barcode scanning devices, and in particular to a system for scanning a barcode using a smartphone and other mobile devices.

In an illustrative embodiment, an aimer accessory for a mobile device is provided. The aimer accessory includes a body configured for being affixed to the mobile device. The body includes a collimator terminating with a grating disposed in a distal portion thereof. The grating is configured to receive light from a lamp of the mobile device and to generate a light pattern on the surface containing a barcode. Registration of the light pattern and the barcode in a scan area enhances the ability of the mobile device to capture a barcode image. Registration may be configured for blind mode or target mode scanning. In blind mode scanning, the registration occurs on a detection of the light pattern and the barcode in a viewing angle of a camera of the mobile device. In target mode scanning, the registration occurs on a detection of the light pattern hovering over the barcode in a viewing angle of a camera of the mobile device.

In another illustrative embodiment, a mobile device configured for either blind or targeted scanning of a barcode is provided. The mobile device includes a body configured for being clipped onto the mobile device. The body includes a collimator terminating with a grating disposed in a distal portion thereof. The grating is configured to receive light from a lamp of the mobile device and to generate a light pattern on the surface containing the barcode. Registration of the light pattern and the barcode in a scan area enhances the ability of the mobile device to capture a barcode image. Registration may be configured for blind mode or target mode scanning. In blind mode scanning, the registration occurs on a detection of the light pattern and the barcode in a viewing angle of a camera of the mobile device. In target mode scanning, the registration occurs on a detection of the light pattern hovering over the barcode in a viewing angle of a camera of the mobile device.

In another illustrative embodiment, a method for configuring a mobile device for scanning a barcode is provided. The method includes selecting an aimer accessory for the mobile device. The aimer accessory includes a body configured for being affixed to the mobile device. The body includes a collimator terminating with a grating disposed in a distal portion thereof. The grating is configured to receive light from a lamp of the mobile device and to generate a light pattern on the surface containing a barcode. Registration of the light pattern and the barcode in a scan area enhances the ability of the mobile device to capture a barcode image. The aimer accessory is affixed to the mobile device. Registration may be configured for blind mode or target mode scanning. For blind mode scanning, the method may further include detecting the light pattern and the barcode in a viewing angle of a camera of the mobile device and capturing the image of the barcode target. For targeted mode scanning, the method may further include detecting the light pattern as hovering over the barcode in a viewing angle of a camera of the mobile device and capturing the image of the barcode target.

BRIEF DESCRIPTION OF THE DRAWINGS

The features and advantages of the invention are apparent from the following description taken in conjunction with the accompanying drawings in which:

FIG. 3A is a perspective diagram depicting an illustrative embodiment of an aimer accessory coupled to the mobile device of FIG. 1, and FIG. 3B is an exploded view of the aimer accessory of FIG. 3A;

FIG. 8 depicts an illustrative memory map of bar code symbologies used in the method of FIG. 6;

DETAILED DESCRIPTION OF THE INVENTION

Figure 1A:
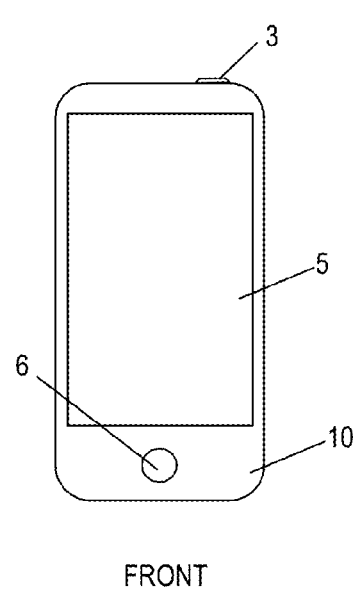
FIGS. 1A and 1B, collectively referred to herein as FIG. 1, show a diagram depicting aspects of a mobile device such as a smartphone.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Disclosed herein are methods and apparatus that permit users of mobile devices, such as a smartphone, to perform "blind and targeted scanning" of barcodes and other information bearing symbols. Generally, the methods and apparatus include an aimer module that collimates diffuse light from a lamp (LED or flash mechanism) on a mobile device for use in capturing a barcode image. The aimer module may also be integrated into a given mobile device or a protective case. Alternatively, the aimer module may be configured as an attachment for retrofit of a mobile device. Operation of the mobile device may be complemented with additional software to take advantage of the functionality of the aimer module. In order to provide some background for the teachings herein, some context is first provided.

Referring now to FIG. 1, there is shown aspects of an illustrative mobile device 10. In this example, the mobile device 10 is a "smartphone." Alternatively, the mobile device may be a tablet, an electronic pad, a laptop computer, or other mobile device. Salient aspects of the mobile device 10 include a home button 6, an on/off switch 3, a display 5, a camera 7, and a lamp 9. Generally, the foregoing components are conventional and provide functionality that is well known in the art. The mobile device 10 may be referred to herein as "smartphone 10" and by other similar terms. Illustrative smartphones include the IPHONE from Apple Corp. of Cupertino, Calif., devices operating on the ANDROID platform of Google Corp. of Mountain View, Calif., as well as devices operating in the WINDOWS environment provided by Microsoft Corp. of Redmond, Wash.

Figure 1B:
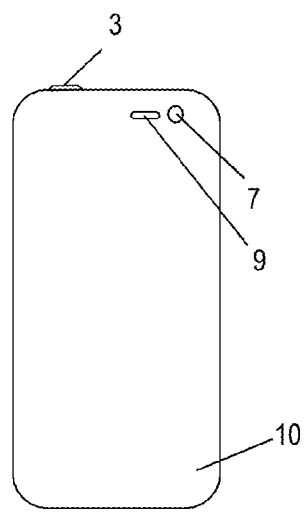

For purposes of convention and to aid in the discussion herein, terms of orientation are provided with regard to the figures. For example, FIG. 1A depicts the front of the mobile device 10. FIG. 1B depicts the back of the mobile device 10. The terms of orientation are with reference to orientation during operation of the mobile device 10. Generally, orientation of other components, such as the aimer module introduced herein, are with reference to orientation of the mobile device 10. For example, it is conceivable the aimer module mentioned herein could be adapted for usage on the front facing camera of the mobile device. However, again, this is not limiting of the teachings herein.

Figure 2:
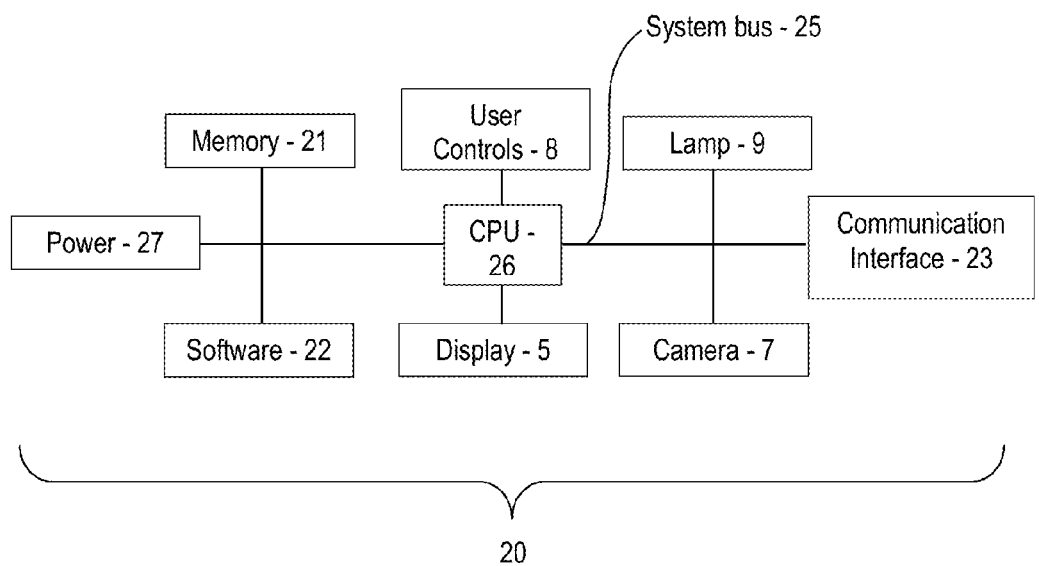
FIG. 2 is an illustrative topology for components of the mobile device of FIG. 1.

Referring now to FIG. 2, an illustrative topology 20 of the mobile device 10 is provided. The illustrative topology 20 depicts some of the components implemented in the mobile device 10. Included in the illustrative topology 20 is at least one central processing unit (CPU) 26. The central processing unit (CPU) 26 is connected to or in communication with other components through system bus 25. Illustrative other components include a power supply 27, memory 21, software 22, user controls 8, a display 5, a camera 7 (can be front or rear facing on mobile device 10), a lamp 9, and a communication interface 23.

The CPU 26 may be an ARM or other processor. The power supply 27 may be from a battery or a source of direct current (DC), such as a transformer coupled to a conventional alternating current (AC) outlet. User controls 8 may be a home button 6 and an on/off switch 3 shown in FIG. 1. Display 5 may include at least one of LCD, LED, OLED, AMOLED, IPS and other technologies. Lamp 9 may be a light emitting diode (LED).

The communication interface 23 may include a wired interface and/or a wireless interface. The wireless interface may include a wireless service processor. Illustrative wireless interfaces may make use of a protocol such as cellular, Bluetooth, Wi-Fi, near field technology (NFC), ZigBee, or other technology. Communication services provided over the wireless communication interface may include Wi-Fi, Bluetooth, Ethernet, DSL, LTE, PCS, 2G, 3G, 4G, LAN, CDMA, TDMA, GSM, WDM and WLAN. The communication interface 23 may include an auditory channel. That is, the communication interface 23 may include a microphone for receiving voice commands, and may further include a speaker. In some embodiments, the speaker may provide an auditory signal when a barcode has been read. The communication interface 23 may further include a status light or other such visual indicators.

The communication interface 23 provides for, among other things, voice communications as well as data communications. The data communications may be used to provide for communication of software and data (such as at least one image; results of analyses, and other such types of data). Communication through the communication interface 23 may be bi-directional or in a single direction.

The mobile device 10 may include additional components such as sensors. Illustrative sensors may include an accelerometer that provides for orientation information and a GPS sensor that provides for location information. The mobile device may also include peripheral interface and communication ports.

As discussed herein, the term "software" 22 generally refers to machine-executable instructions that provide for the implementation of the methods of this disclosure that are explained below. The machine-executable instructions may be stored on non-transitory machine-readable media such as memory 21. Illustrative methods that may be implemented to actuate the mobile device hardware may include instructions for operation of the camera 7, the lamp 9, communications through the communication interface 23, and other aspects of this disclosure as discussed further below. In some of the illustrative embodiments discussed herein, the software 22 provides for detecting and decoding barcodes within an image. However, it should be noted that the term "software" might describe sets of instructions to perform a great variety of functions.

The memory 21 may include multiple forms of memory. For example, the memory 21 may include non-volatile random access memory (NVRAM) and/or volatile random access memory (RAM). Generally, the non-volatile random access memory (NVRAM) is useful for storing software 22 as well as data generated by or needed for operation of the software 22 such as rules, configurations and similar data. The memory 21 may include read only memory (ROM). The read only memory (ROM) may be used to store firmware that provides instruction sets necessary for basic operation of the components within the topology 20.

The camera 7 may include any appropriate sensor and at least one optical element such as a lens. Generally, the camera 7 may include those components as needed to record (also referred to as "capture") images of items such as a barcode and further include photodetectors, amplifiers, transistors, and processing hardware and power management hardware. The lamp 9 may include any appropriate source of illumination. Illustrative components for the lamp 9 include at least one light emitting diode (LED).

Although the illustrative mobile device 10 disclosed is a smartphone, the mobile device 10 is not limited to this embodiment and may include other devices. Accordingly, it is not required that the mobile device 10 incorporate all of the components of FIG. 2, and other components may be included. In order to provide some further context for the teachings herein, some terms used herein are now introduced.

As discussed herein, the term "barcode" generally refers to an optical machine-readable symbology that contains a representation of data. Generally, any given barcode is a representation of data that is related to the object to which it is attached. A barcode as discussed herein may include data that is arranged in a one-dimensional (1D) array, a two-dimensional (2D) array; and/or a 3D physical tag. Information may be conveyed in a given barcode according to arrangements of symbology, and may further convey information in a plurality of wavelengths and/or colors (i.e., varying groups of visible wavelengths).

Illustrative forms of one-dimensional (1D) barcodes include: Codabar; Code 25 (Interleaved); Code 25 (Non-interleaved); Code 11; Code 39; Code 93; Code 128; CPC Binary; DUN 14; EAN 2; EAN 5; EAN-8, EAN-13; Facing Identification Mark; GS1-128; GS1 DataBar; HIBC; Intelligent Mail barcode; ITF-14; JAN; KarTrak ACI; Latent image barcode; MSI; Pharmacode; PLANET; Plessey; PostBar; POSTNET; RM4SCC/KIX; Telepen; and UPC., as well as others.

Illustrative forms of two-dimensional (2D) barcodes (also referred to as a "matrix code") include: Aztec Code; Code 1; ColorCode; Color Construct Code; CrontoSign; CyberCode; d-touch; DataGlyphs; Data Matrix; Datastrip Code; digital paper; EZcode; Color; High Capacity Color Barcode; Hue-Code; InterCode; MaxiCode; MMCC; NexCode; Nintendo e-Reader; Dotcode; PDF417; QR code; ShotCode; SPARQCode; and others.

As discussed herein, a "light pipe" or "light tube" is a physical structure used for transporting of light for the purpose of illumination and is an example of an optical waveguide. A light pipe generally provides the transport of light to another location, minimizing the loss of light. A light pipe may include highly transmissive material, and may include reflective materials, collectors, reflectors, concentrators, at least one lens, and other components as deemed appropriate. An illustrative light pipe is an optical fiber. Light pipes, as discussed herein, may be formed of any suitable material. Illustrative materials include acrylic plastic, silicon glass, and other such materials. A light pipe may be hollow and open or closed to the external atmosphere.

Generally, the following discussion provides an introduction to an aimer module, methods for use of the aimer module, aspects of some illustrative embodiments of the aimer module, and some detail on software that may be used in conjunction with the aimer module.

Broadly speaking, an aimer module for a mobile device and method of use is provided by this disclosure. The aimer module collimates diffuse light from a lamp on a mobile device for use in capturing a barcode image. The aimer module includes a means for receiving light from a lamp of the mobile device, and generating a light pattern on the surface containing a barcode. The receiving and generating means may include a grating or configuration of mirrors. Registration of the light pattern and the barcode in a scan area enhances the ability of the specialized software on the mobile device to read the barcode.

As used herein, the term "registration" means that a barcode and a light pattern generated by the aimer module on the surface containing the barcode are in the viewing angle of the camera. This viewing angle can change depending on the lens and the smartphone. In one illustrative example, the camera may use a cone type lens. In this example, if the barcode and the light pattern on the surface containing the barcode are both in the cone of viewing, there would be a registration of the light pattern and the barcode according to this disclosure. As explained in this disclosure, once the barcode and the light pattern generated by the aimer module on the surface containing the barcode are in "registration," the smartphone may capture the barcode image and decode the barcode as explained below.

Broadly speaking, there are at least three types of registration contemplated by this disclosure. These three types of registration correspond to three modes of operation of the aimer module contemplated by this disclosure. These three modes of operation are blind mode scanning, targeted mode scanning, and smartphone display mode scanning, otherwise referred to as display mode scanning. In addition, both blind mode scanning and targeted mode scanning may be used with or without display mode of operation. Hence, this disclosure provides for at least five modes of operation. These modes of operation are depicted in the Table 1 and are explained in greater detail below.

TABLE 1

Modes of operation of Smartphone or Other Mobile Device with Aimer Module

| Configuration | Blind Mode Operation | Targeted Mode Operation | Display Mode Operation |
|---|---|---|---|
| Blind Mode Configuration ON - Display Not Used | Blind Mode Blind | | |
| Blind Mode Configuration ON - Display Used | Blind Mode Targeted | | |
| Targeted MODE Configuration ON - Display Not Used | | Targeted Mode Blind | |
| Targeted MODE Configuration ON - Display Used | | Targeted Mode Targeted | |
| Blind Mode AND Targeted Mode Configurations OFF - Display Used | | | Display Mode |

In blind mode of operation, the light pattern on the surface containing the barcode can be anywhere in the cone of viewing. The user uses the light pattern generated by the aimer module of this disclosure as a pointer and points the light pattern at the surface containing the barcode. There is no need for the user to look through the display of the smartphone when operating the scanning features of this disclosure in blind mode. So long as the user aims the light pattern at the surface containing the barcode, such that the light pattern and barcode are both within the cone of viewing, there is a registration of the light pattern and the barcode in blind mode according to this disclosure. As indicated in Table 1, the user may employ blind mode operation with or without the use of the display. The most efficient manner of blind mode operation involves a blind mode blind operation without the use of the display. In this case, the user would simply look at and direct the light pattern generated by this disclosure at or around the barcode image in order to "register" the light pattern with the barcode image as previously explained. After registration, the barcode image is captured by activation of a mechanical trigger on the smartphone, an activation button on the display of the smartphone, or by lapse of a predetermined period of time after registration of the light pattern with the barcode image as explained below. However, in some cases of blind mode operation, the user may look through the display of the smartphone to assist in the guiding of the pattern of light at or about the barcode image. This mode of operation is known as blind mode targeted mode of operation since the display of the smartphone is used to "target" the pattern of light at or about the barcode image to generate the registration required for blind mode operation as taught by this disclosure.

In targeted mode of operation, the light pattern on the surface containing the barcode must hover over the barcode. As in blind mode, the user uses the light pattern generated by the aimer module of this disclosure as a pointer and points the light pattern at the surface containing the barcode. In targeted mode, the light pattern must hover over the barcode to be in registration unlike blind mode where registration may occur when the light pattern is shining outside the barcode but still within the cone of viewing. As the user aims the light pattern at the surface containing the barcode such that the light pattern is hovering over the barcode and within the cone of viewing, there is a registration of the light pattern and the barcode in targeted mode according to this disclosure. As indicated in Table 1, the user may employ targeted mode operation with or without the use of the display. The most efficient manner of targeted mode operation involves a targeted mode blind operation without the use of the display. In this case, the user would simply look at and "hover" the light pattern generated by this disclosure over the barcode image in order to "register" the light pattern with the barcode image as previously explained. After registration, the barcode image is captured by activation of a mechanical trigger on the smartphone, an activation button on the display of the smartphone, or by lapse of a predetermined period of time after registration of the light pattern with the barcode image as explained below. However, in some cases of targeted mode of operation, the user may look through the display of the smartphone to assist in the guiding of the pattern of light to hover over the barcode image. This mode of operation is known as targeted mode targeted mode of operation since the display of the smartphone is used to "target" the pattern of light to "hover" over the barcode image to generate the registration required for targeted mode operation as taught by this disclosure.

In display mode of operation, the user uses the display of the smartphone to point the camera lens at the image. So long as the user points the camera lens at the image such that the light pattern and barcode are both within the cone of viewing, there is a registration of the light pattern and the barcode in smartphone display mode according to this disclosure. The aimer module is not used when the smartphone is operating in display mode of operation. Instead of using the light pattern generated by the aimer module of this disclosure, the lamp of the smartphone is used conventionally to provide direct diffuse lighting for illuminating the barcode image in order that the smartphone can capture the barcode image.

Referring now to FIG. 3, aspects of the illustrative mobile device 10 are shown. In this example, the mobile device 10 is outfitted with an aimer module that in FIG. 3 is depicted as aimer accessory 30. Generally, the aimer accessory 30 is tightly coupled to the mobile device 10 using conventional techniques. For example, the aimer accessory 30 may be configured as an attachment piece for use in retrofitting of a given mobile device 10. Alternatively, the aimer accessory 30 may be integrated into a given mobile device 10. In embodiments in which the aimer accessory 30 is attached to the mobile device, the aimer accessory 30 may be attached by snap-fit connection as illustratively shown in FIGS. 23-26 and as explained below. In other embodiments, the aimer accessory 30 may be an accessory that is integrated into a protective case in which the mobile device 10 is stored. In other embodiments, the aimer accessory 30 may be an accessory that is permanently affixed to the mobile device 10. For example, the aimer accessory 30 may be glued to the mobile device 10. In some other embodiments, the aimer accessory 30 may be temporarily affixed to the mobile device 10. For example, the aimer accessory 30 may include an embedded magnet that is magnetically attracted to the housing of the mobile device 10. Some designs of the aimer accessory 30 provide for mechanical retention of the aimer accessory 30 on the mobile device 10 (for example, refer to FIG. 18). The aimer accessory 30 may also be referred to herein simply as the "aimer 30."

Figure 3A:
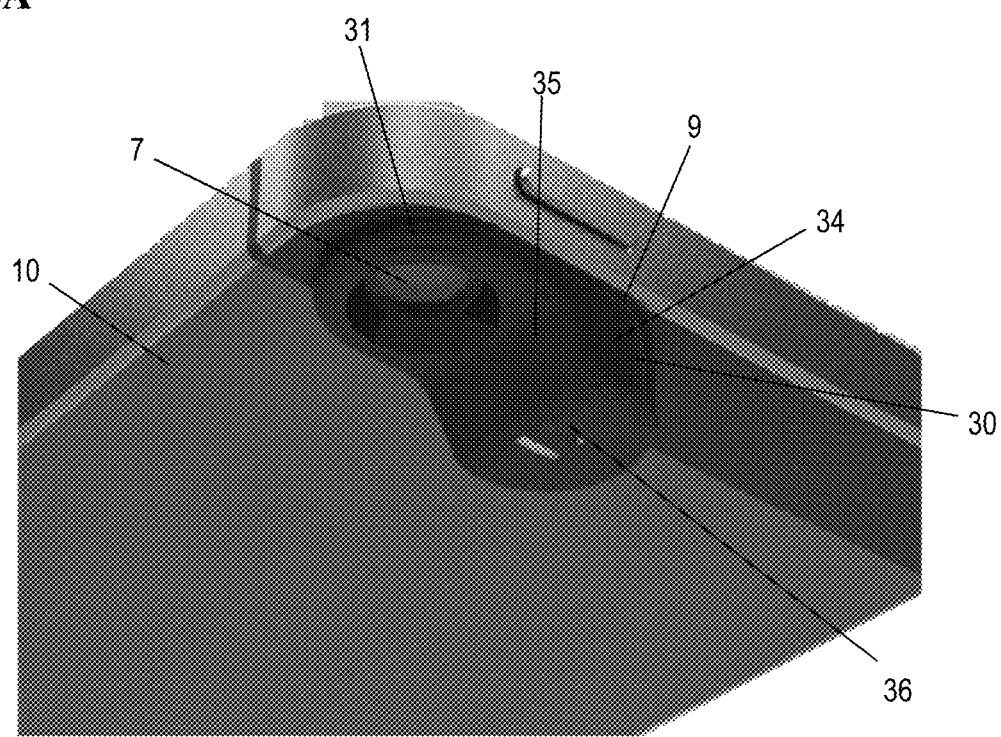
FIGS. 3A and 3B are collectively referred to herein as FIG. 3.
Figure 3B:
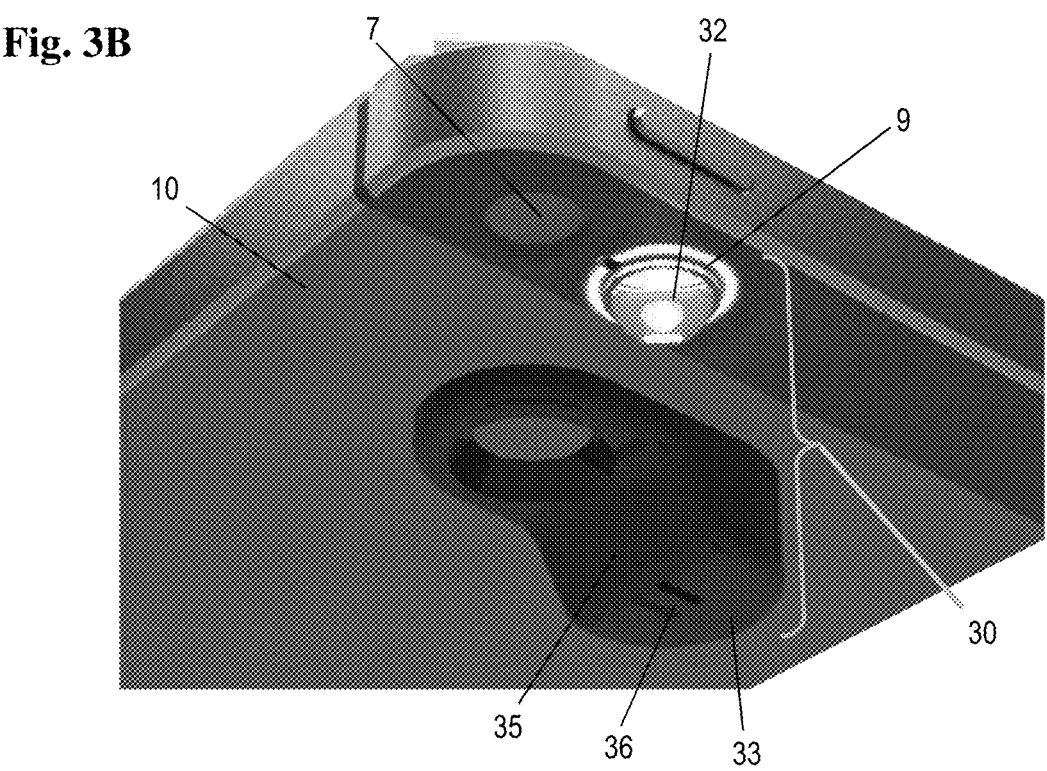
Figure 4A:
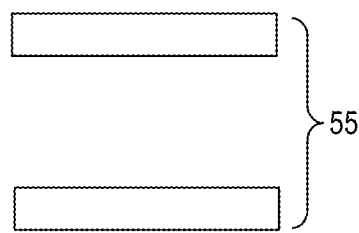
FIGS. 4A through 4E, collectively referred to herein as FIG. 4, are depictions of embodiments of possible light patterns produced by the mobile device and accessory depicted in FIG. 3.
Figure 4B:
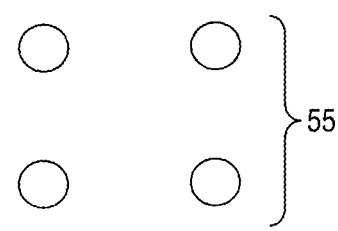
Figure 4C:
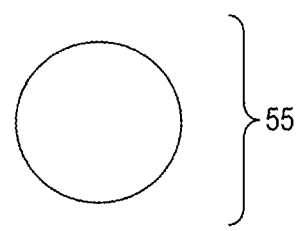
Figure 4D:
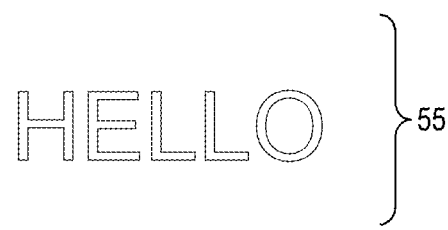
Figure 4E:
Figure 5A:
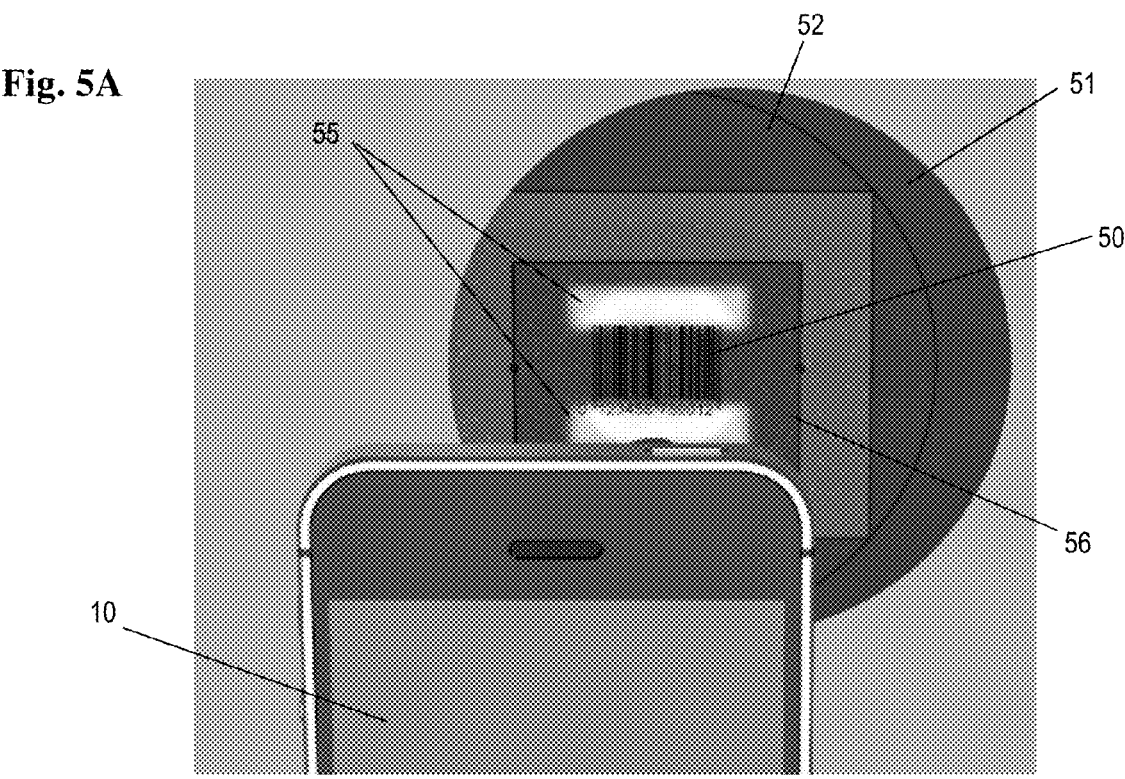
FIG. 5A-D are illustrations depicting light patterns generated by the aimer accessory of FIG. 3 in relation to a barcode.
Figure 5B:
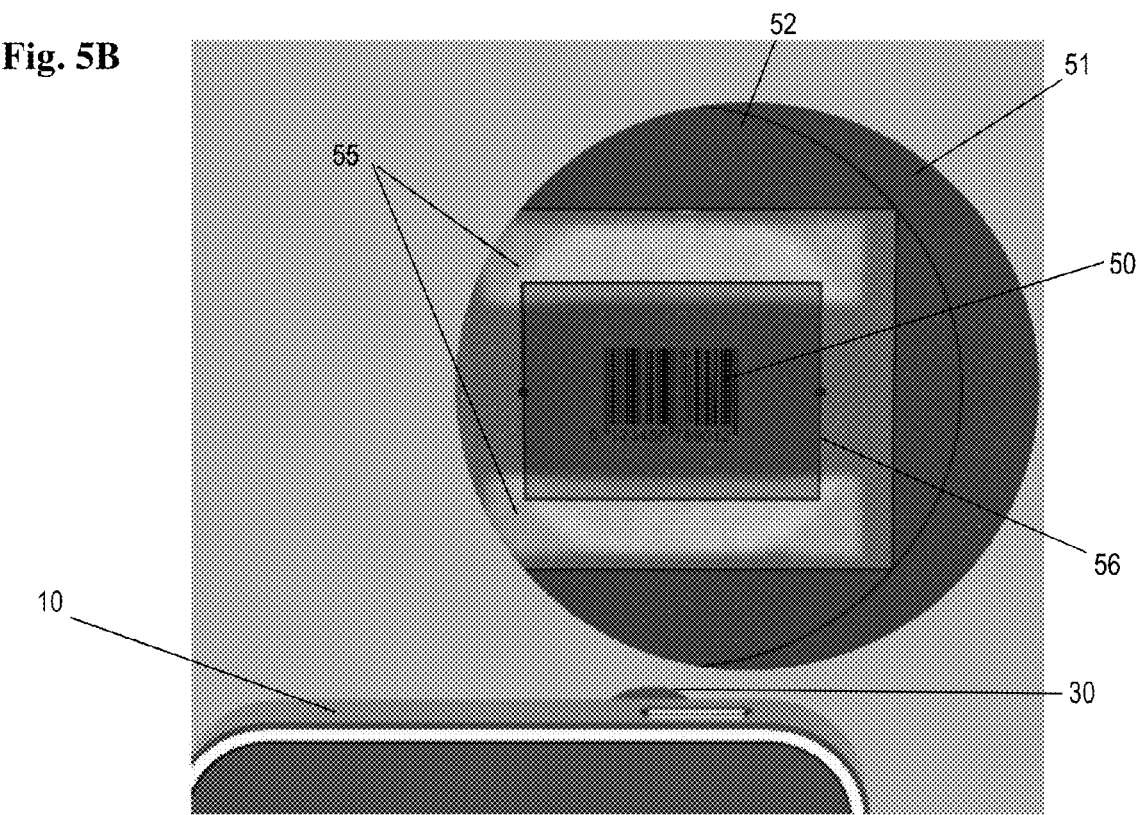
Figure 5C:
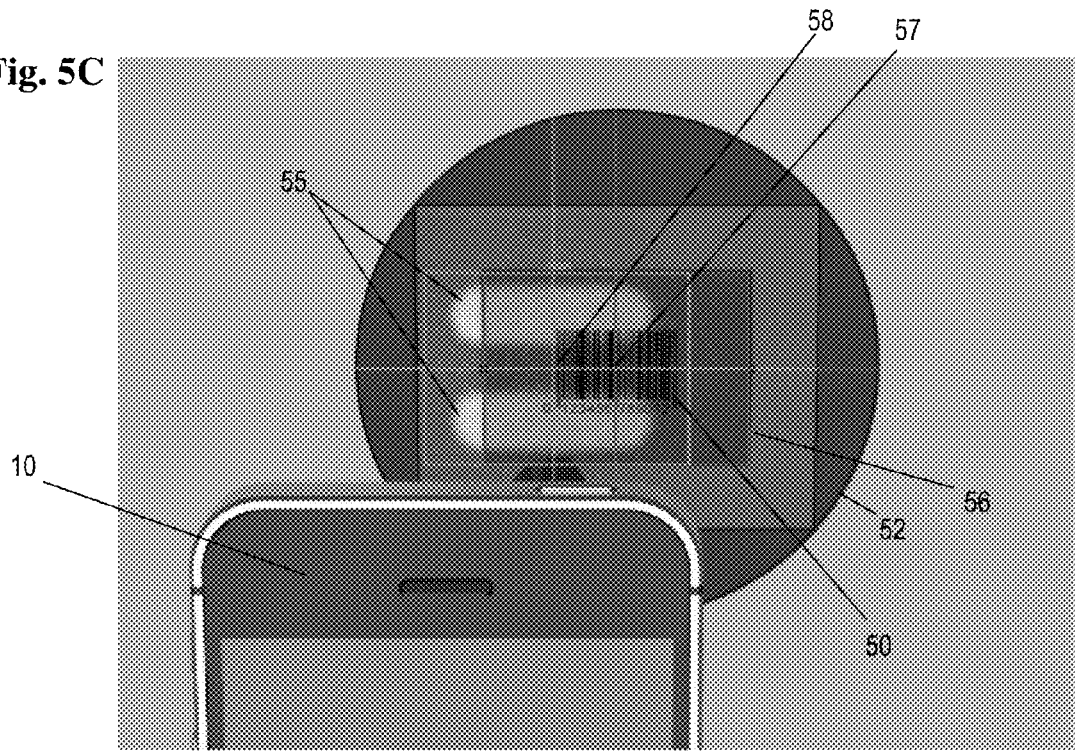
Figure 5D:
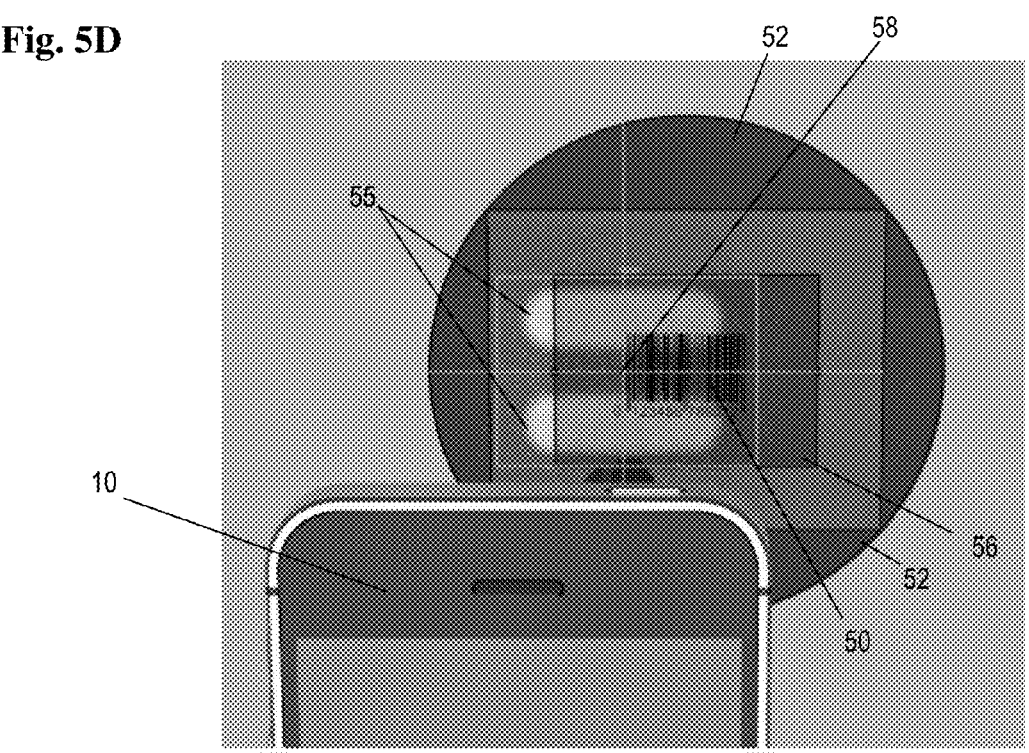
Figure 10:
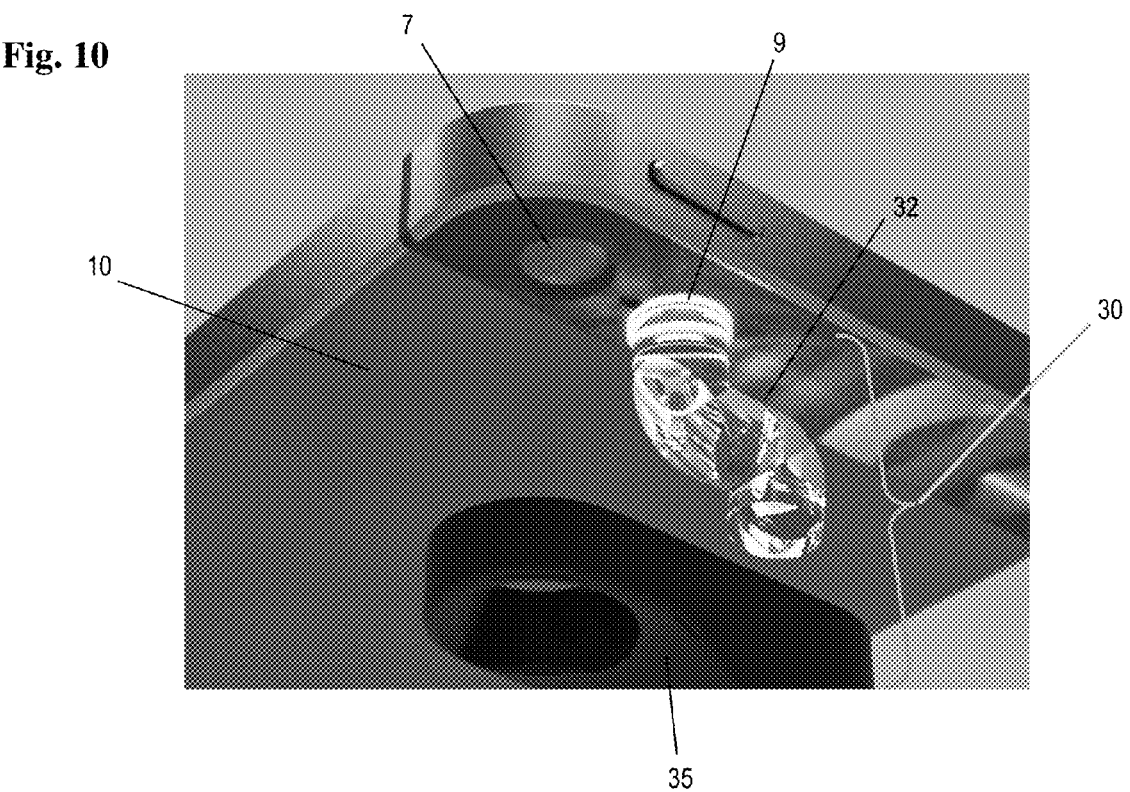
FIG. 10 is an exploded view of the aimer accessory of FIG. 9.
Figure 21:
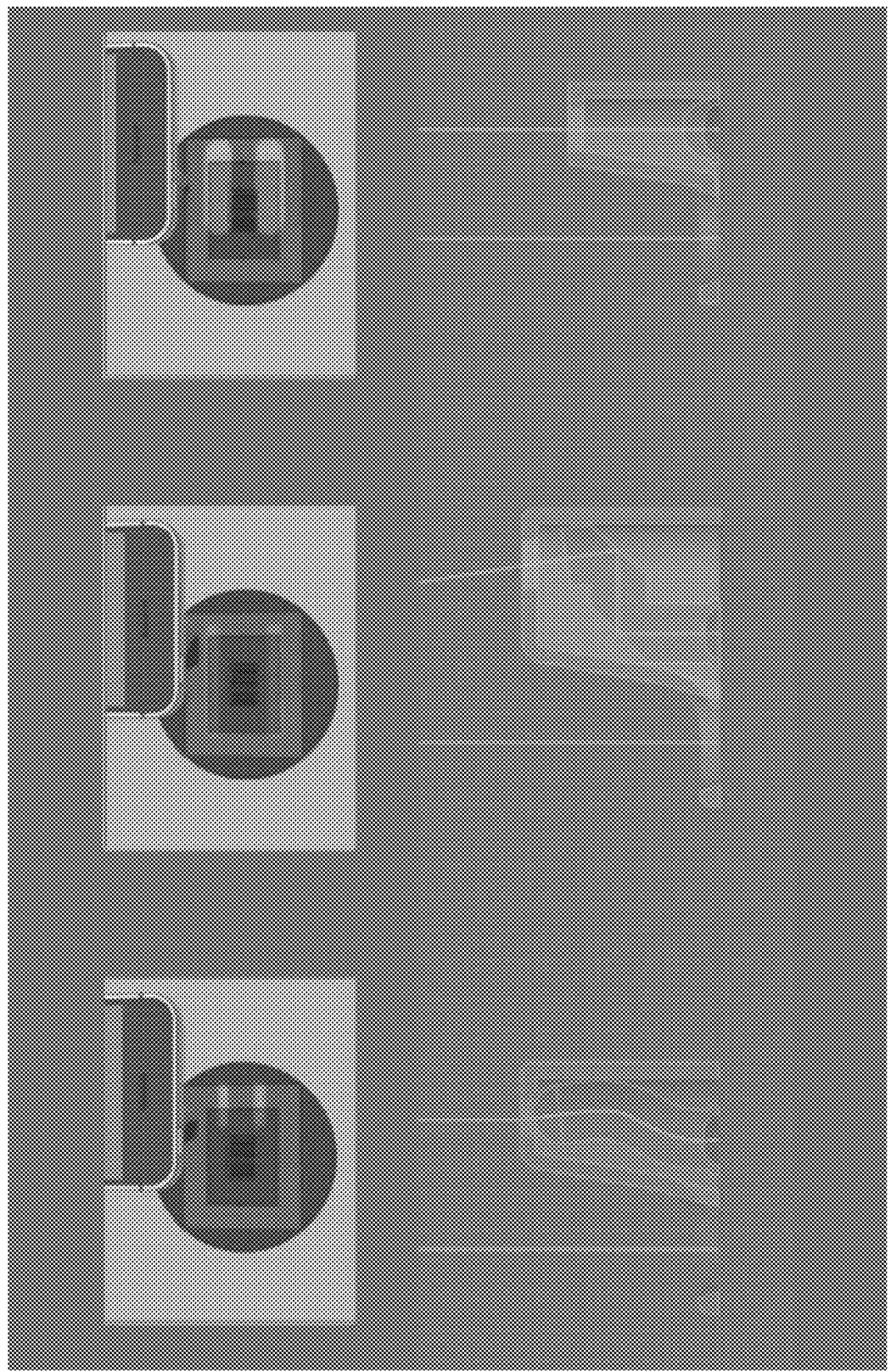
FIG. 21 are illustrative embodiments of light pipes or light-ray trace paths that are taught by this disclosure.

In the illustrative embodiment depicted in FIG. 3 (i.e., FIGS. 3A and 3B), the aimer accessory 30 includes a body 35. The body 35 includes a collector 31 that surrounds the lens and sensor associated with the camera 7. The body 35 further includes a collimator 34. The collimator 34 provides for collimation of light from the lamp 9. The distal portion 33 of the collimator 34 (see FIG. 3B) includes a grating 36. Generally, the grating 36 receives light from the lamp 9. The light may pass through at least one optical element 32. Then at least one optical element 32 may provide for focusing light from the lamp 9 and/or directing the light through the grating 36. In the example shown, at least one optical element 32 is disposed over the lamp 9. In some embodiments, at least one optical element 32 includes a light pipe. In the example shown in FIG. 3B, optical element 32 is shown as a hemispherical element. Illustrative embodiments with other configurations of the light pipe are shown in FIGS. 10 and 21. In the example shown in FIG. 3, the grating 36 illustratively includes two substantially parallel slits disposed in the distal portion 33 of the collimator 34. As explained below, some example patterns that may be disposed in the grating 36 include parallel slits, a substantially rectangular array of holes, a rectangular array of holes, and a pattern of an icon. Some resulting light patterns (also referred to as a "pattern of light") produced by the grating 36 are shown in FIG. 4. Generally, the grating 36 provides for casting a pattern of light 55 onto a sample for imaging. In the examples discussed herein, the sample includes various forms of barcodes.

In some embodiments, at least one mirror is used with or without the grating 36. In some other embodiments, at least one mirror is used with additional optical elements as deemed appropriate. This is explained further in connection with FIG. 20A-C.

Referring now to FIGS. 5 through 8, aspects of a process for imaging a barcode 50 with the aimer 30 are shown. In each of FIGS. 5 through 8, a user at some distance holds the mobile device 10 from the barcode 50. The software 22 (shown in FIG. 2) has been invoked and is causing the mobile device 10 to attempt imaging of the barcode 50.

In FIG. 5, an illustrative barcode 50 is shown. The illustrative barcode 50 is located within a field of view (FOV) 51. The field of view (FOV) 51 represents the entire area that is naturally visible to the camera 7 of the mobile device 10 (i.e., viewing angle of the camera). This is also what the user sees on the display of a camera when doing a display mode scan, as taught in the prior art. A shifted field of view (SFOV) 52 is also shown. The shifted field of view (SFOV) 52 is a subset of the field of view (FOV) 51 and is a result of processing by the specialized software 22. The shifted field of view (SFOV) 52 represents an area within the field of view (FOV) 51 that aligns with a light pattern 55 that is cast by the aimer accessory 30. This light pattern is what the user uses to do a blind scan or targeted scan according to this disclosure. A scan area 56 is maintained within the shifted field of view (SFOV) 52. Generally, the scan area 56 is a region of the shifted field of view (SFOV) 52 that is used by the software 22 to look for a barcode.

As shown in FIGS. 5A-D, the light pattern 55 correlates with the appearance of the grating 36 (see FIG. 3B). That is, referring back to FIGS. 3 and 4, it may be seen that the grating 36 illustratively includes two parallel slits from which light is emitted. In each of FIGS. 5 through 8, the light pattern 55 correlates with the two substantially parallel slits. Alternatively, the light pattern 55 may be any of the other patterns illustrated in FIG. 4, but also other shapes depending on the implementation of the grating 36.

The software 22 makes use of the light pattern 55 cast by the aimer accessory 30. Generally, once the software 22 has received a command from the user to commence scanning, or a predetermined period of time has elapsed after registration of the light pattern and the barcode, the software 22 begins processing images collected from the camera 7 on a continuing basis. When the light pattern 55 is appropriately manifested within the scan area 56, the software 22 identifies a focal point 57 (shown in FIG. 5C). In this example, the focal point 57 is centered within the scan area 56. The software 22 recognizes the apparition of the barcode 50, and adjusts the focal point 57 to a start of the barcode 50. Once an adjusted focal point 58 has been determined, the software 22 will read the captured barcode 50. Once the captured barcode 50 has been read, the software 22 may store data in the memory 21 (shown in FIG. 2).

Figure 6:
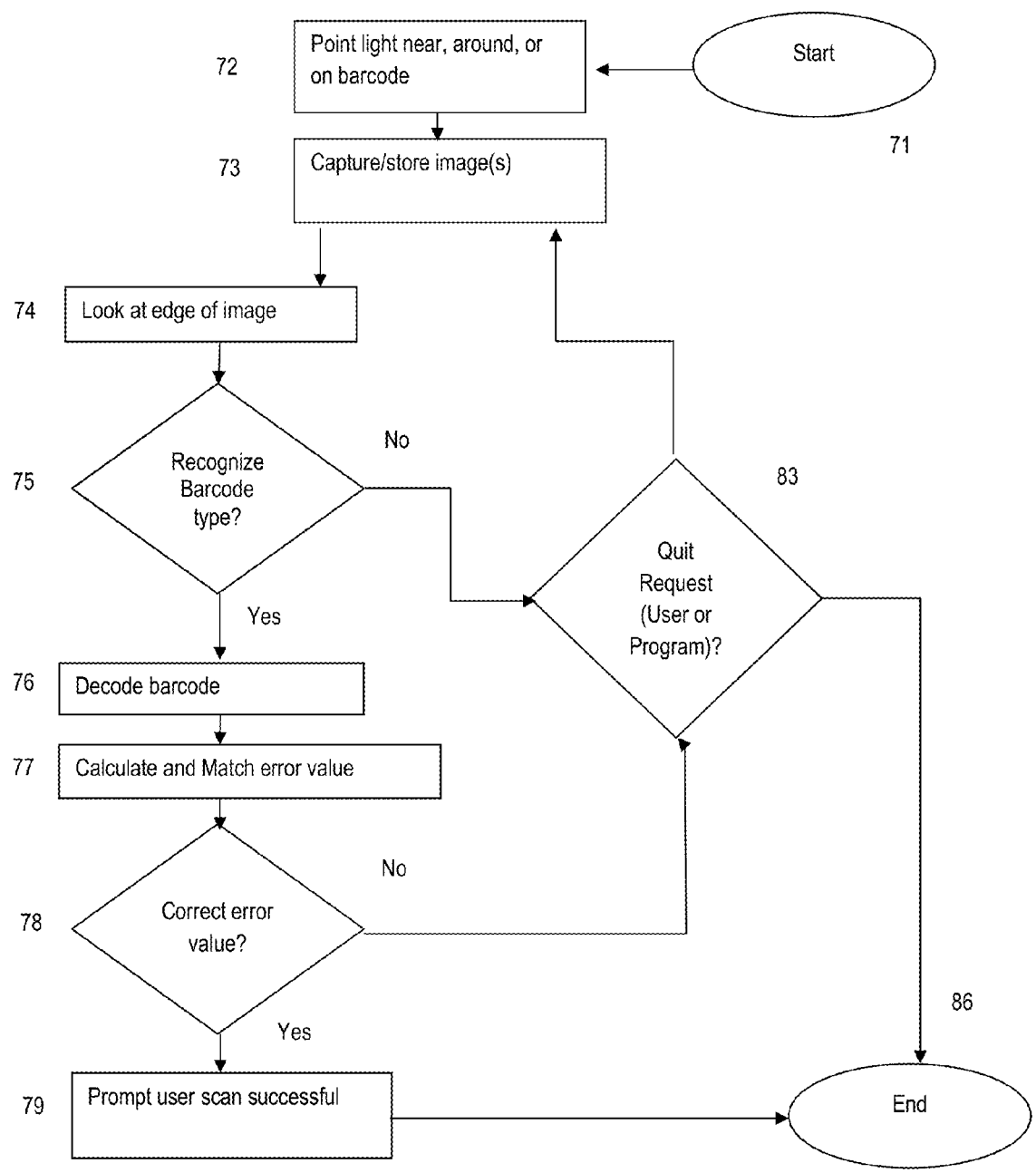
FIG. 6 depicts an illustrative method according to this disclosure for using the aimer module of this disclosure.

FIG. 6 depicts an illustrative method for using the aimer module of this disclosure. The process starts 71 by user selection of mode of operation—namely, blind mode blind mode operation, blind mode targeted mode operation, targeted mode blind mode operation, targeted mode targeted mode operation, or display mode operation. After selection of the operational mode, the user points 72 the light near, around, or on the barcode. In both blind mode blind mode operation and targeted mode blind mode operation, the user uses the light pattern generated by the aimer module of this disclosure as a pointer and points the light pattern at the surface containing the barcode. The light pattern generated by the aimer module guides the user on where to point the light pattern. In both blind mode targeted mode operation and targeted mode targeted mode operation, the user uses the display of the smartphone to point the light pattern generated by the aimer module of this disclosure at the surface containing the barcode. In display mode, the lamp of the smartphone is used conventionally to provide direct diffuse lighting for illuminating the barcode image in order that the smartphone can capture the barcode image.

The decoding software of this disclosure takes care of decoding the images of the barcode captured by the smartphone. In both blind mode blind mode operation and targeted mode blind mode operation, there is no need for the user to look through the display of the smartphone when operating the scanning features of this disclosure in blind or targeted mode. In blind mode targeted mode operation, targeted mode targeted mode operation, and display mode operation, the user will look through the display to point the light at the barcode.

Further, in blind mode blind mode operation and blind mode targeted mode, it is only necessary for the user to aim the light pattern generated by the aimer module at the surface containing the barcode such that the light pattern and barcode are both within the cone of viewing. This ensures registration of the light pattern and the barcode in blind mode according to this disclosure. In targeted mode blind mode operation and targeted mode targeted mode operation, it is necessary for the user to aim the light pattern at the surface containing the barcode such that the light pattern is hovering over the barcode and within the cone of viewing. This ensures registration of the light pattern and the barcode in targeted mode according to this disclosure. In display mode, the aimer module is not used when the smartphone is operating in display mode of operation. Instead of using the light pattern generated by the aimer module of this disclosure, the lamp of the smartphone is used conventionally to provide direct diffuse lighting for illuminating the barcode image in order that the smartphone can capture the barcode image.

A user may find the blind mode of operation most efficient when a surface contains only a single barcode. With a single barcode within the cone of vision, the specialized software of the mobile device, equipped with an aimer module of this disclosure, recognizes there is only one barcode to decode. The decoding software may invoke the scan any time during the process as previously explained. No further logic is needed. However, when a surface contains two or more barcodes, the software of the aimer module requires further logic to determine which barcode to decode. This disclosure provides this further logic within the targeted mode of operation by requiring the user to point the light pattern within the barcode desired for decoding and keep the light pattern over the barcode (i.e., hover over the barcode). The user then initiates a trigger to capture the image or the user hovers over the barcode for a predetermined period of time which may be set by the user. Illustratively, this period of time may be one-half second, but the exact time is a matter of design choice. It will be appreciated that a user may use the aimer module of this disclosure in targeted mode to also scan a surface containing a single barcode. However, because this mode of operation requires the user to hover the light pattern over the barcode, it may be a less efficient procedure for scanning a single barcode than scanning the barcode in blind mode of operation, but with multiple barcodes present in a given area on a page, it may be the desired method of reading the targeted barcode. With display mode, the software of the aimer module requires further logic to determine when the user has lined up the camera lens with the barcode through the display. This logic is illustratively provided by a trigger the user may initiate after the display indicates the camera lens is lined up with the barcode.

The smartphone captures 73 one or more images and typically stores them in memory 21 (FIG. 2) of the smartphone. The capture may be initiated by user activation of a mechanical trigger. Alternatively, the capture may be initiated by user activation of a button on the smartphone, such as an on-screen software button or a physical re-programmed button. In another example, the capture may be automatically initiated (e.g., software initiated) a predetermined period of time after registration of the light pattern and the barcode as explained in this disclosure. In either instance, software responsive to the initiation would begin the capture of a series of images. Typically, the camera may grab 25 or 30 frames of captured images a second. Some cameras may grab 60 frames a second. The number of frames of images captured by the camera is dependent on the camera. In either event, the captured images are stored in memory 21 (FIG. 2) of the smartphone.

Figure 7:
FIG. 7 depicts an example of a PDF417 barcode useful for understanding the method of FIG. 6.

Starting with one captured image, which may be the first image captured and stored in memory, the software of the aimer module will look 74 at an edge of the captured image. FIG. 7 depicts an example of a PDF417 barcode useful for understanding the method of FIG. 6. The beginning and the ending of the barcode, herein referred to as the edge of the barcode, contains a start character and a stop character. The start and stop characters are used by the software of the aimer module of this disclosure to identify the type of barcode (i.e., its symbology). Hence, and referring back to FIG. 6, aimer module software looks 74 at the edge of the captured image for the start and stop characters to identify the type of barcode.

The aimer module software then determines the symbology of the barcode. In this regard, the aimer module software will illustratively access a memory map of symbologies such as depicted in FIG. 8 to match the start and stop characters it has determined to the start and stop characters appearing in the table. If it finds a match, the aimer module software has identified the symbology of the barcode.

If the aimer module software does not recognize the barcode type whether because it has not identified a start and/or stop character or the start and/or stop characters it has identified do not match the start and stop characters in the memory map depicted in FIG. 8, the aimer module will determine 83 if it has another captured image of the barcode to further use in this process of decoding the captured barcode. If the aimer module software determines there are further images available for use in the process, the aimer module software will advance to the next captured image 73 and repeat steps 74 and 75. If the aimer module software determines there are no further images available for use in the process, the aimer module software prompts the user that the scan failed and the process ends 86. This would be done by a program. However, the process depicted in FIG. 6 may be brought to the process end 86 also by the user at any time. For example, a user could activate a mechanical or touch button on a screen programmed to bring the program to the process end 86. In the case of either the user or the program bringing the process depicted in FIG. 6 to the process end 86, this means that the user will need to begin the process over if the scan of the barcode remains of interest.

If the aimer module software recognizes the barcode type, the aimer module software decodes 76 the barcode and then calculates and matches 77 the check sum it has calculated with the check sum found in the pattern of the barcode. The aimer module software then determines 78 if the calculated error is correct (i.e., that the calculated check sum matches the check sum in the pattern of the barcode). If the calculated error value is not correct, the aimer module software will determine 83 if it has another captured image of the barcode to further use in this process of decoding the captured barcode. If the aimer module software determines there are further images available for use in the process, the aimer module software will advance to the next image 73 and repeat steps 74, 75, 76, 77, and 78. Alternatively, the aimer module software may advance to the next image and repeat only steps 76, 77, and 78. This would be the case if the aimer module software is programmed to assume that all of the captured barcode images are of the same type. In that event, once the aimer module software has identified the type of barcode from one barcode image, it can skip the look 74 at edge of image and recognize 75 barcode type steps and proceed directly to decode 76, calculate and match 77 error value, and correct 78 error value steps of the process.

If the aimer module software determines there are no further images available for use in the process, at the determination 83 step, aimer module software prompts the user that the scan failed and the process ends 86. This means that the user will need to begin the process over if the scan of the barcode remains of interest. Of course, a user termination of the process at any time would be received at the determination 83 step and also advance the process to the process end 86 as previously explained.

If the aimer module software determines 78 that the calculated error is correct (i.e., that the calculated check sum matches the check sum in the pattern of the barcode), the aimer module software prompts 79 the user that the scan was successful and the process ends 86. The notification can be an audible, a vibration, a display LED coloring or blinking, or any combination of these or other physical notifications.

Figure 9:
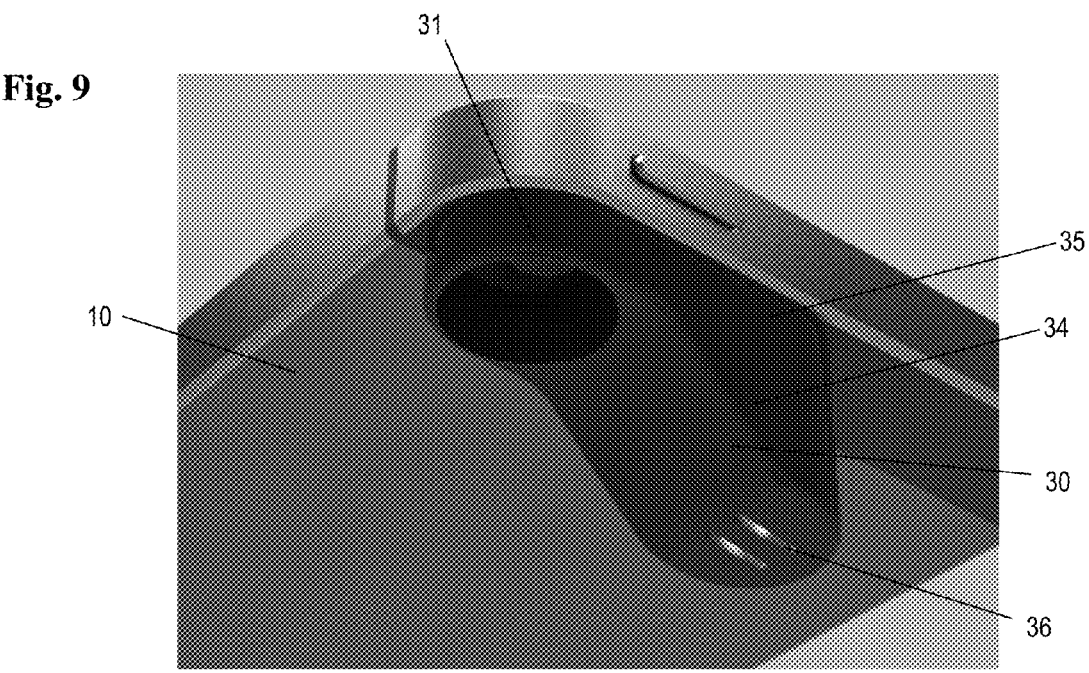
FIG. 9 depicts an alternative embodiment of an aimer accessory.

FIGS. 9 and 10 depict another embodiment of the aimer accessory 30. In this example, the aimer accessory 30 is configured to offset the optical path taken by the light that is emitted by the lamp 9. The offset provides for effectively redirecting light from the lamp 9 some distance from the camera 7. In this example, this is accomplished by using an optical element 32 that includes a light pipe (shown in FIG. 10). Generally, the light pipe includes substantially transmissive material. In this example, the light pipe also includes reflective surfaces that provide for internal reflection within the light pipe.

Figure 11:
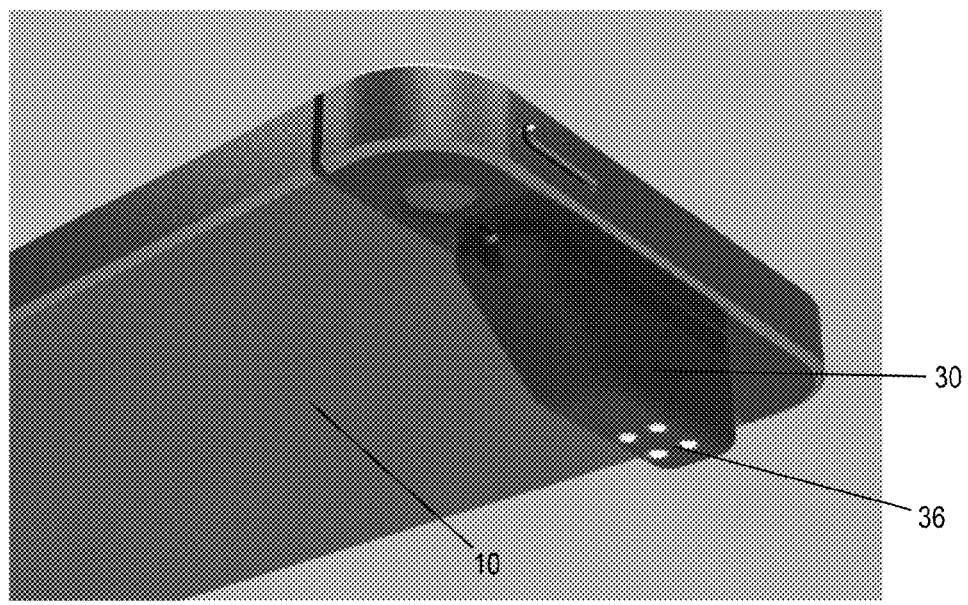
FIG. 11 depicts yet another embodiment of an aimer accessory of this disclosure.
Figure 12:
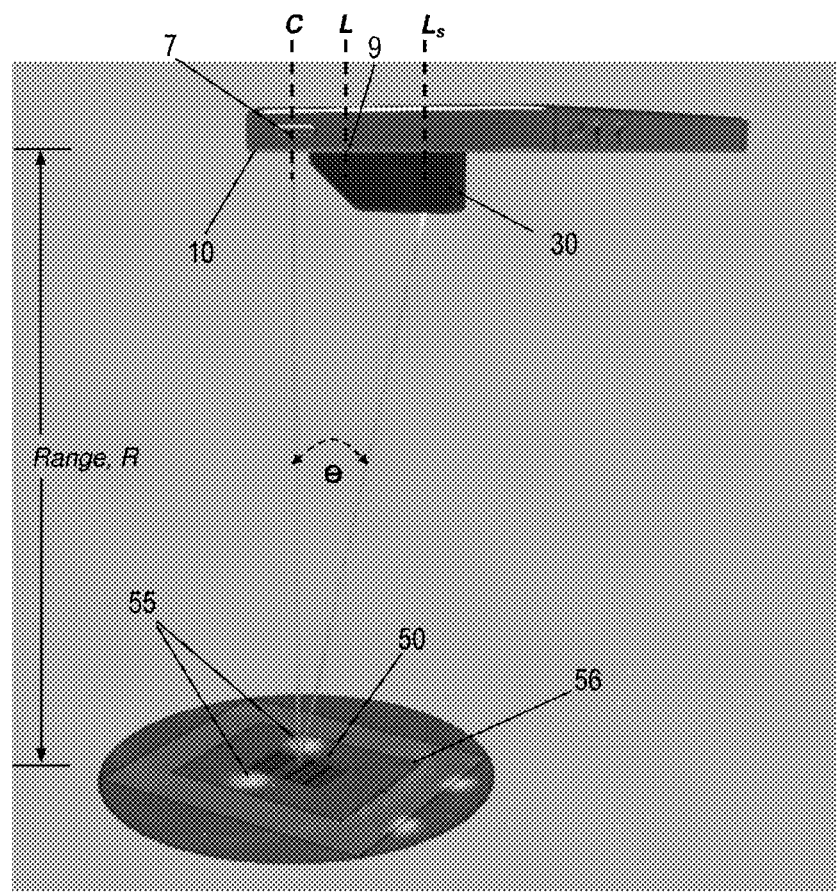
FIG. 12 depicts aspects of light patterns and relationships of the mobile device and aimer accessory of FIG. 11 with a barcode.

FIGS. 11 and 12 provide yet another embodiment of the aimer accessory 30. In this example, the aimer accessory 30 does not include a collector 31. However, this embodiment of the aimer accessory 30 does include an offset of the optical path taken by the light that is emitted by the lamp 9 (FIG. 1). Additionally, this embodiment of the aimer accessory 30 includes a grating 36 having an array of holes arranged in a substantially rectangular pattern.

Referring in particular to FIG. 12, aspects of the offset and the consequence are shown in greater detail. In the mobile device, the camera 7 is aligned with a camera axis, C. The lamp 9 is aligned with a light axis, L. By incorporation of an offset within the aimer accessory 30 as taught by this disclosure, light emitted from the aimer accessory 30 is redirected to a light shifted axis, $L_S$. The resulting offset may be measured as the distance between the light shifted axis, $L_S$, and the light axis, L. Accordingly, the offset angle, $\theta$, between the camera axis, C and the effective light axis (which is now shifted light axis, $L_S$, instead of the light axis, L) is increased. That is, the effective range, R, is increased. More specifically, a greater distance between the mobile device 10 and the plane where the scan area 56 and the light pattern 55 converge is realized.

Without the teachings of this disclosure, lamp 9 diffuses and emits light across a wide range of angles with respect to light axis, L. With this disclosure, the light from lamp 9 is collimated and redirected to the light shifted axis, $L_S$, to improve the ability of the user to point the smartphone or mobile device's built-in camera at a barcode in order to capture and decode the barcode. Because the light is shifted, there is also less interference between the shifted light and the reflected image that is captured by the camera. This may in some circumstances allow the camera to capture a better quality image than with ambient light. While the effect of the offset is to increase the effective range, R, this increase was found to be negligible and to not significantly alter the advantages obtained by collimating the light and redirecting the collimated light to the light shifted axis, $L_S$. The transformation of diffuse light from lamp 9 into a collimated beam of light according to this disclosure effectively serves to modify the lighting from lamp 9 into a flashlight. Advantageously, this "flashlight" allows for blind and targeted aiming of the mobile device at, and efficient scanning of, a barcode according to the teachings of this disclosure.

Moreover, ambient light may oftentimes be sufficient to allow for the capture of barcode images of a quality sufficient for decoding. An additional feature of this disclosure is that it provides additional lighting to the barcode surface which may improve the contrast of the dark and light barcodes and hence provide for capture of better quality barcode images.

Figure 13A:
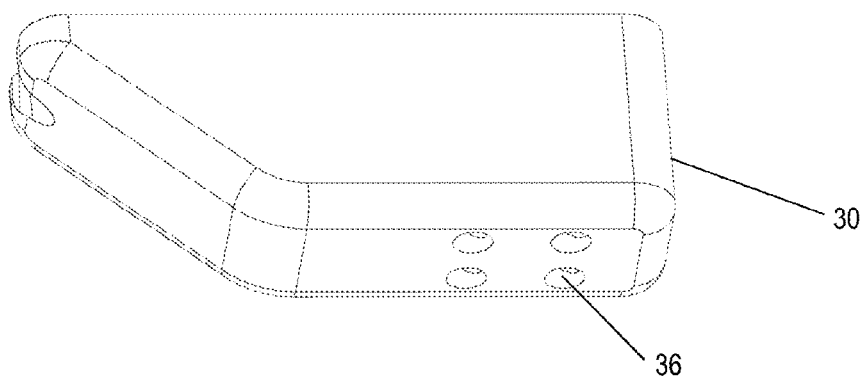
FIGS. 13A through 13C, collectively referred to herein as FIG. 13, are perspective diagrams depicting aspects of the aimer accessory depicted in FIG. 11.
Figure 13B:
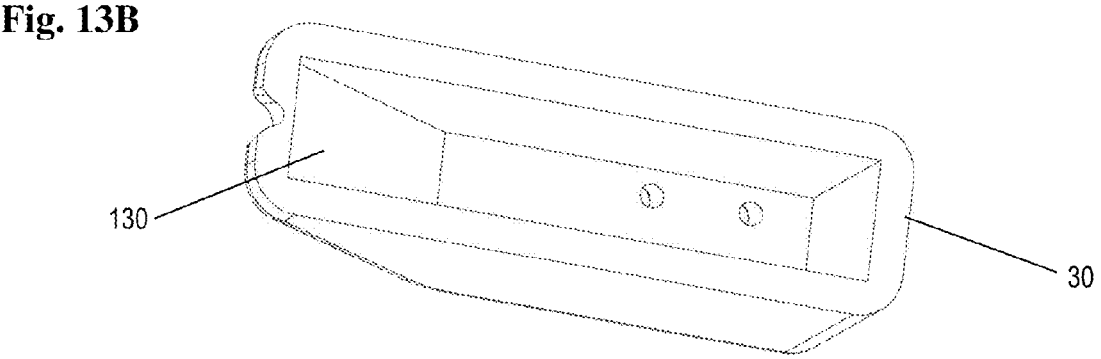
Figure 13C:

FIG. 13 depicts an embodiment of the aimer accessory 30 that does not include a collector 31 but provides an offset. FIG. 13A is a perspective view. FIG. 13B is a top down view, and shows an interior of the aimer accessory 30; it further shows a reflective surface 130 incorporated therein. At least another reflective surface (not shown) may be included to direct light through the grating 36. FIG. 13C is a cutaway view of the aimer accessory 30. This embodiment of the aimer accessory 30 is referred to as a "simple offset aimer."

Figure 14A:
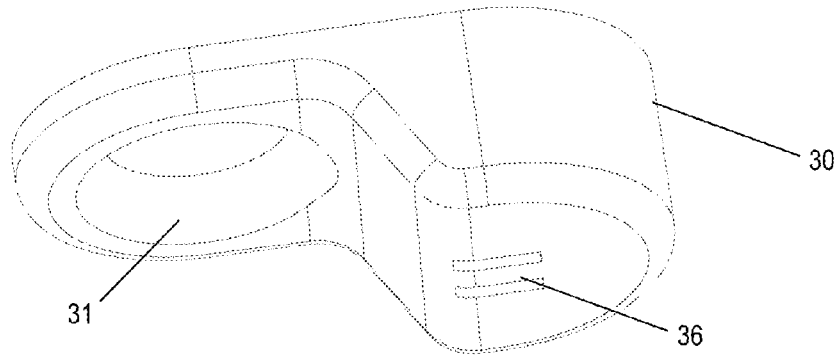
FIGS. 14A through 14C, collectively referred to herein as FIG. 14, are perspective diagrams depicting aspects of the aimer accessory depicted in FIG. 3.
Figure 14B:
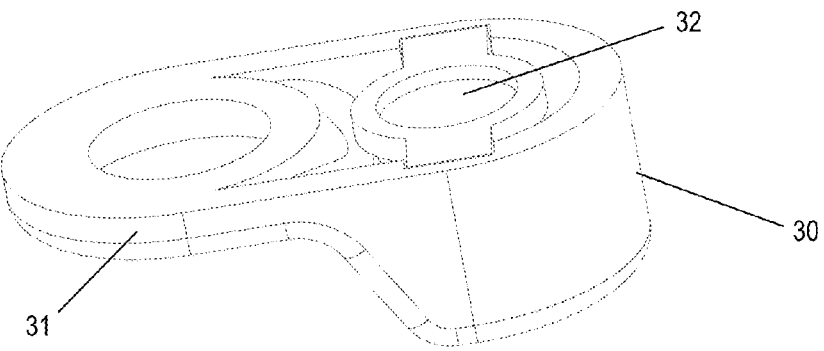
Figure 14C:
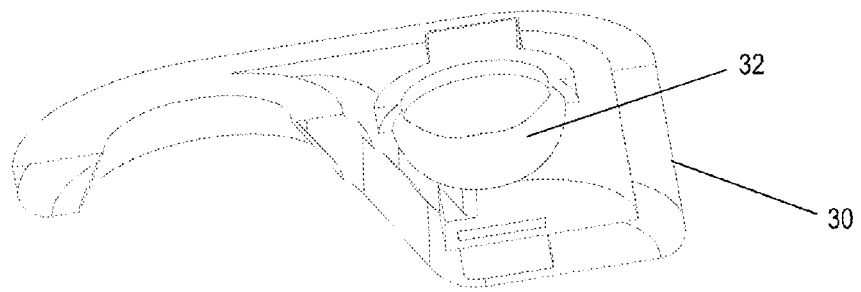

FIG. 14 depicts an embodiment of the aimer accessory 30 that includes the collector 31 and does not have an offset. FIG. 14A is a perspective view; FIG. 14B is a top down view. FIG. 14C is a cutaway view of the aimer accessory 30, and better shows the optical element 32. In this example, the optical element 32 is a lens. This embodiment of the aimer accessory 30 is referred to as a "basic aimer."

Figure 15A:
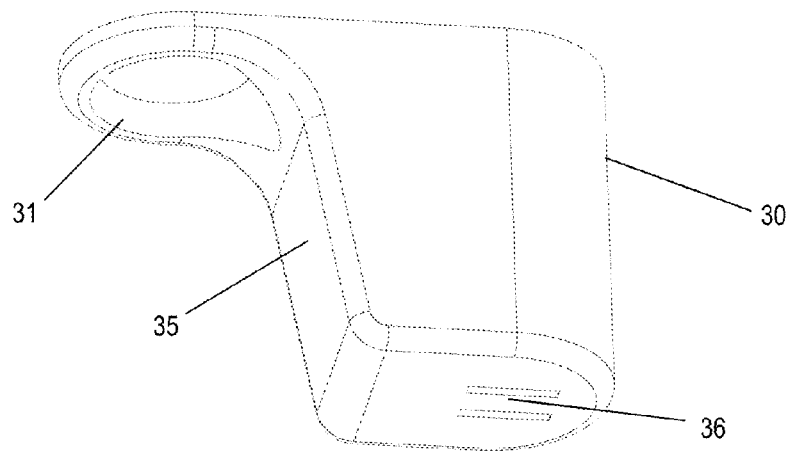
FIGS. 15A through 15C, collectively referred to herein as FIG. 15, are perspective diagrams depicting aspects of another embodiment of the aimer accessory.
Figure 15B:
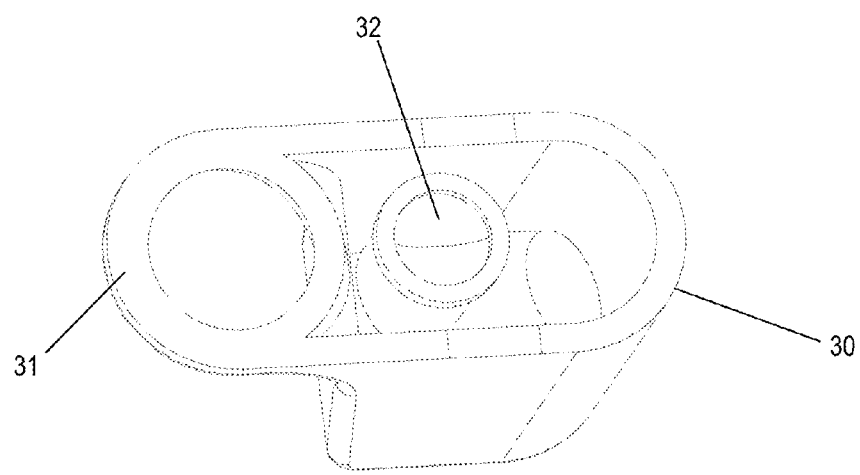
Figure 15C:
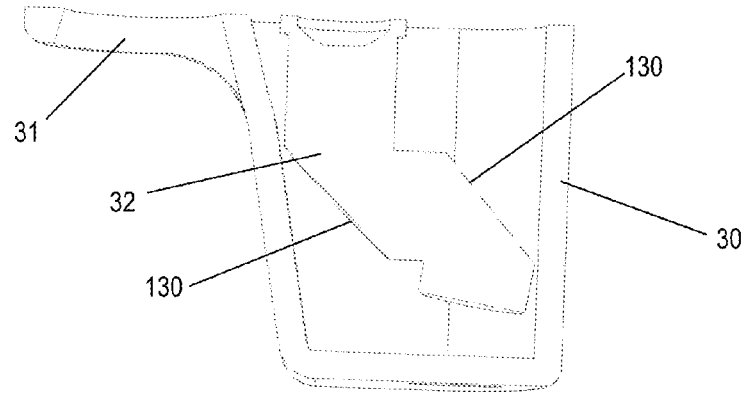

FIG. 15 depicts an embodiment of the aimer accessory 30 that includes the collector 31 and an offset. FIG. 15A is a perspective view; FIG. 15B is a top down view. FIG. 15C is a cutaway view of the aimer accessory 30, and better shows the optical element 32. In this example, the optical element 32 includes a lens disposed within a light pipe. The light pipe is comparatively elongated (with reference to FIG. 16). However, it is not necessary that the light pipe extend completely to the grating 36 in the distal portion 33. This embodiment of the aimer accessory 30 is referred to as an "elongated offset aimer."

Figure 16A:
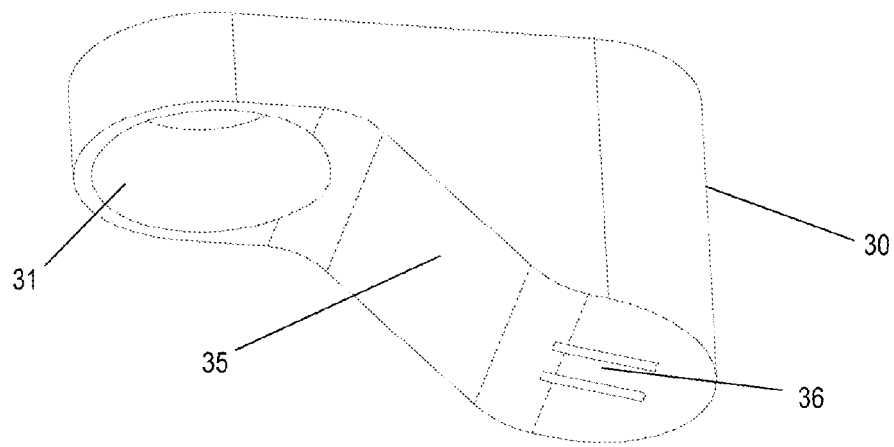
FIGS. 16A through 16C, collectively referred to herein as FIG. 16, are perspective diagrams depicting aspects of the aimer accessory depicted in FIG. 9.
Figure 16B:
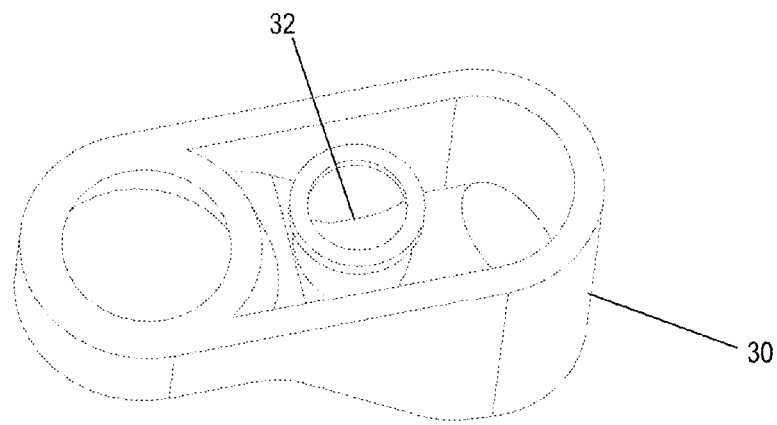
Figure 16C:
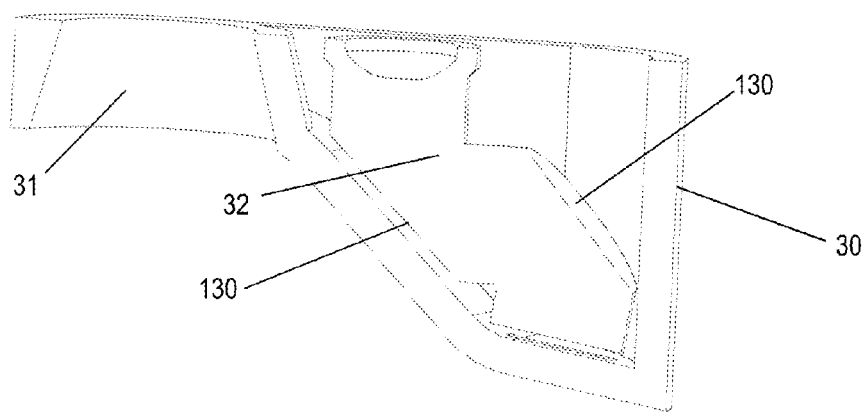

FIG. 16 depicts an embodiment of the aimer accessory 30 that includes the collector 31 and an offset. FIG. 16A is a perspective view; FIG. 16B is a top down view. FIG. 16C is a cutaway view of the aimer accessory 30, and better shows the optical element 32. In this example, the optical element 32 includes a lens disposed within a light pipe. The light pipe is comparatively shortened (with reference to FIG. 15). Accordingly, this embodiment of the aimer accessory 30 is referred to as a "standard offset aimer."

Figure 17A:
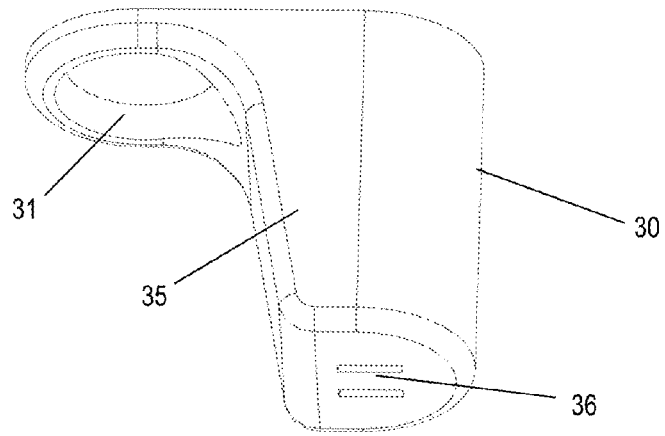
FIGS. 17A through 17C, collectively referred to herein as FIG. 17, are perspective diagrams depicting aspects of another embodiment of the aimer accessory.
Figure 17B:
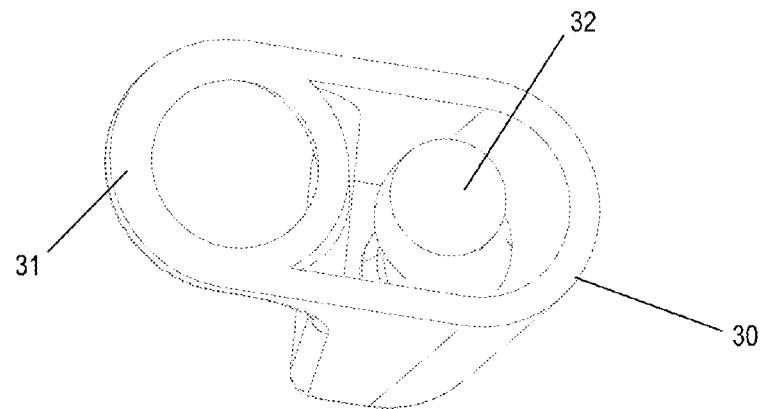
Figure 17C:
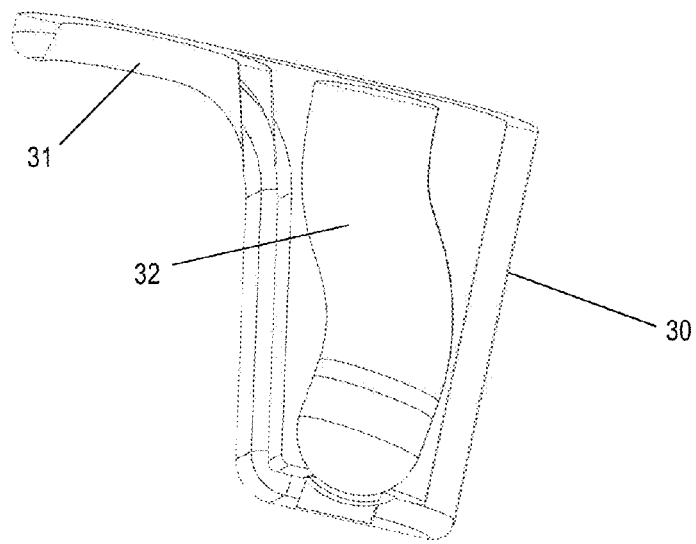

FIG. 17 depicts an embodiment of the aimer accessory 30 that includes the collector 31 and an offset. FIG. 17A is a perspective view; FIG. 17B is a top down view. FIG. 17C is a cutaway view of the aimer accessory 30, and better shows the optical element 32. In this example, the optical element 32 includes a lens disposed within a light pipe. The light pipe is of a continuous tube shape and includes a lens disposed at the distal end. Accordingly, this embodiment of the aimer accessory 30 is referred to as a "tube offset aimer."

Figure 18A:
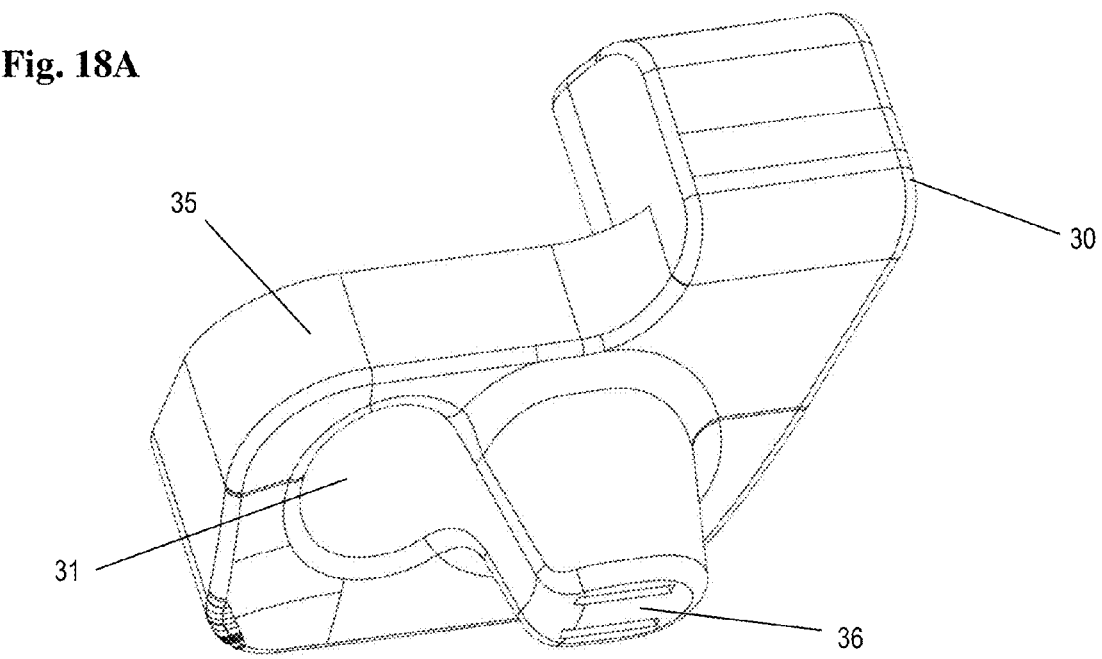
FIGS. 18A through 18B, collectively referred to herein as FIG. 18, are perspective diagrams depicting aspects of another embodiment of the aimer accessory.
Figure 18B:
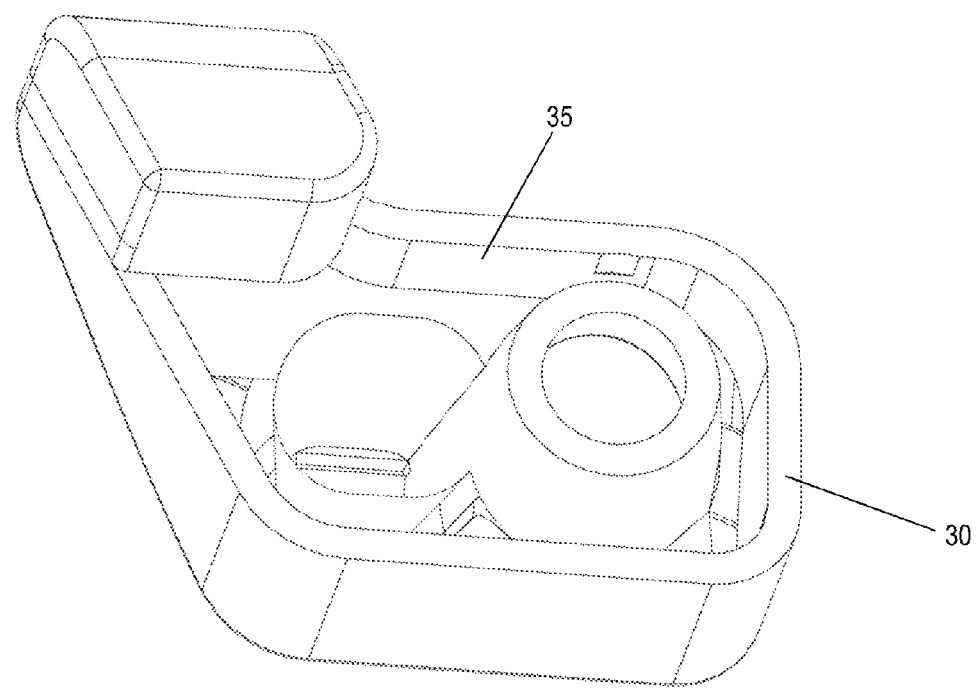

FIG. 18 depicts an embodiment of the aimer accessory 30 that includes the collector 31, with no offset and a substantial body 35. FIG. 18A is a perspective view; FIG. 18B is a top down view. In this example, the body 35 proves form fitting onto the mobile device 10. That is, in this embodiment of the aimer accessory 30, the body 35 has been configured to closely follow a particular configuration of the mobile device 10. Accordingly, this embodiment of the aimer accessory 30 is referred to as a "fitted aimer."

Figure 19:
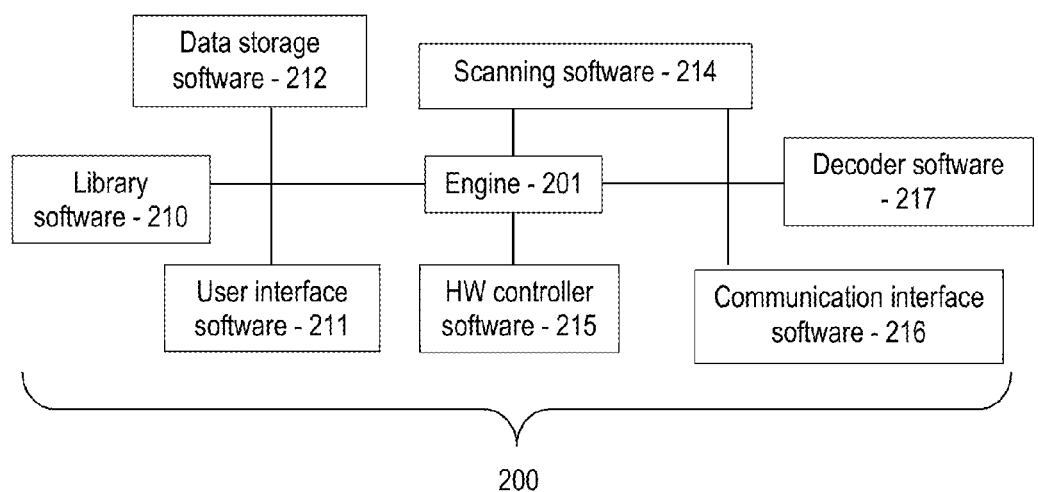
FIG. 19 depicts illustrative components of software useful for reading barcodes with the aimer accessory.

FIG. 19 shows an instance of a barcode reader software 200 for providing some of the functionality herein described. The instance includes an engine 201, a scanning software 214, a decoder software 217, a data storage software 212, a library software 210, a user interface software, a hardware controller software 215, and a communication interface software 216.

The scanning software 214 includes the executable instructions for performing the scanning functions of registration and capturing a barcode image as described in FIG. 6. The scanning software 214 will receive data from the camera 7 and evaluate the received data for presence of a barcode. The evaluation may include identification of the shifted field of view (SFOV) 52, the scan area 56, and searching for presence of the barcode 50 that is in registration with the light pattern 55. When the scanning software 214 has identified the appropriate requirements for data collection, the scanning software 214 will capture the barcode 50.

The decoder software includes the executable instructions for transforming the barcode image data represented by the electrical signals into an encoded ASCII character data string.

The data storage software 212 includes the executable instructions for storing and retrieving captured barcode images and other data in a memory. The library software 210 includes the executable instructions for storing and retrieving information such as symbology type from a library registry within the memory. Additionally, the library registry may also include information regarding a variety of aimer accessories 30. For example, a user may wish to exchange aimer accessories 30 while in the field, like to exchange a tube offset aimer of FIG. 17 for the basic aimer of FIG. 14. Accordingly, the user may remove a first aimer accessory 30 (e.g., the tube offset aimer) from a mobile device 10 and place a second aimer accessory 30 (e.g., the basic aimer) onto the mobile device. When this occurs, the user may communicate the second aimer accessory type to the engine software 201 using the graphical user interface rendered by the user interface software 211. The engine software 201 may then employ the library software 210 to reference data stored in the library registry regarding the second aimer accessory 30 for use in configuring the smartphone and software accordingly. Alternatively, the hardware controller software 215 may detect the attachment of the second aimer accessory 30 and prompt the engine software 201 to cause the user interface software 211 to render on the display a selection of settings for aimer accessories useable with the smartphone. In the specific example, the settings would include the settings for the tube offset aimer and the settings for the basic aimer. On user selection of the setting for the basic aimer, the scanning software 214 will then adjust scanning functions accordingly.

In another embodiment, the instance of a barcode reader software 200 may recognize a specific aimer module shape and if recognized for a specific timeframe while hovering over a specific barcode for a programmed amount of time (~500 msec or 1 sec), then this triggers a barcode scan and initiates a decode of the barcode data.

The user interface software includes the executable instructions for displaying a graphical user interface on the display for configuring the instance of the barcode reader software 200 and for rendering images, such as an image of the barcode on the display of the smartphone. For example, user interface software 211 may generate text, alert information, auditory signals, alarms, warnings, pictures, graphics, or other types of output. In some embodiments, output of the interface software 211 may be used to invoke other functions. For example, output of the interface software 211 may be sent via communication interface software 216 to a printer, or it may be sent to a smartphone to initiate a phone call, or sent to any computing device to perform some other function.

The hardware controller software 215 includes the executable instructions for controlling the hardware of the smartphone such as controlling the camera lens to bring a barcode image into focus, energizing the lamp, controlling the display to render images, controlling the speaker of the smart phone to prompt a user, and so on.

The communication interface function 216 includes the executable instructions for communicating data to or from a remote device. The communicating to a remote device may include conducting a query of a remote source, such as a database, for more comprehensive information. The query may be received by the communication interface function 216 from the user through the user interface software 211. Similarly, a remote user may communicate information over the communication interface 216 to the smartphone. Thus, for example, a smartphone may be remotely programmed with software updates and updates to the database, such as the table of symbologies. Programming may occur over-the-air. Alternatively, the smart phone may be tethered to a remote device via a communication cable to provide such remote programming or bi-directional communication between the smart phone and the remote device. The remote device may be a computing device, for example, another smart phone, a desktop computer, or server, including a cloud server, capable of communicating with the smart phone that is operating according this disclosure.

The engine 201 includes the executable instructions that coordinate the operation of the foregoing and other programs on the smartphone The software 200 described in connection with FIG. 19 may be provided to a mobile device by a specialized application. For example, a mobile application including the foregoing functionalities for performing this disclosure is typically downloaded to a smartphone, but also may be preloaded. Alternatively, the software may be functionality embedded inside the operating system.

By virtue of the registration process of the light pattern 55 of this disclosure with a barcode 50 on a target as explained in this disclosure, an appropriately equipped mobile device 10 is capable of automatic scanning and reading of barcodes. That is, the mobile device 10 that is so equipped does not require human intervention to carefully focus the camera through the display 5. The user need not look through the view finder projected on the display to focus the image to be captured by the mobile device. Instead, in blind mode blind mode operation and target mode blind mode operation, the user need only point the collimated light that is generated according to this disclosure at the barcode. Accordingly, the teachings herein provide for enablement of "blind" and "targeted" blind mode scanning. That is, the blind or targeted scanning according to this disclosure permits a user to read a barcode without viewing and focusing of the device camera through use of the display 5 (shown in FIG. 1). More specifically, the user only needs to "aim" or "point" the mobile device using the aimer module at the barcode and the mobile device will read the barcode. Of course, this disclosure also provides for blind mode targeted mode and targeted mode targeted mode where the display of the smartphone is used by the user to assist in lining up the pattern of light with the barcode image as taught by this disclosure. In addition, this disclosure also provides for a scanning operation performed in display mode where the aimer module of this disclosure is not used in the scanning operation; rather, diffuse lighting from the conventional smartphone is used to illuminate a barcode in order to capture the barcode image using conventional scanning techniques.

In some embodiments, the software 22 of the code reader 200 depicted in FIG. 19 may be developed on a remote computer, such as a personal computer. The software 22 may then be downloaded to the mobile device.

Figure 20A:
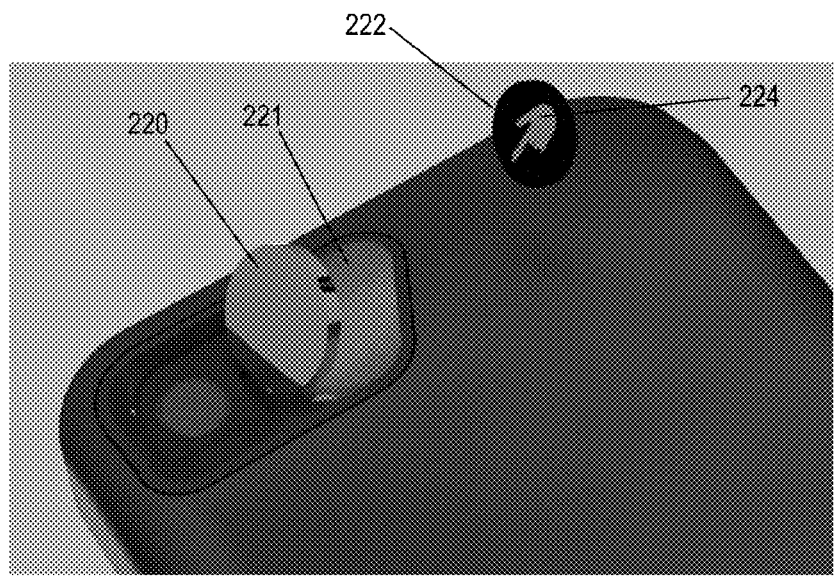
FIGS. 20A, 20B, and 20C, collectively referred to herein as FIG. 20, are perspective drawings of alternative embodiments of this disclosure indicating possible shapes for the light source.
Figure 20B:
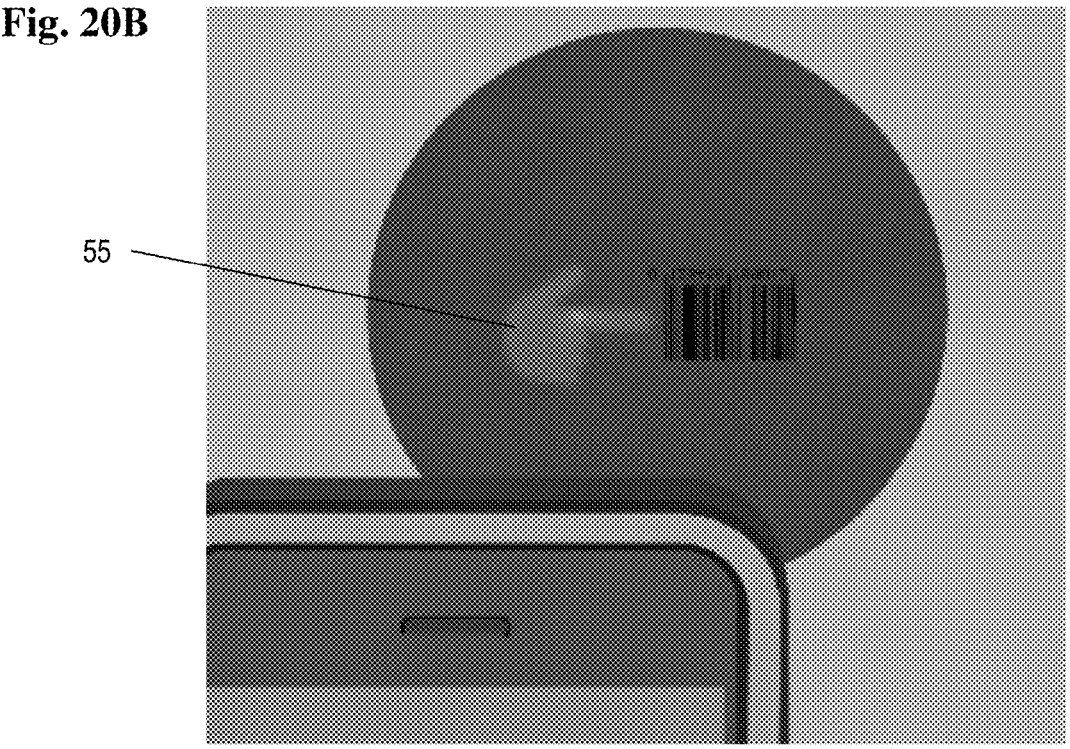
Figure 20C:
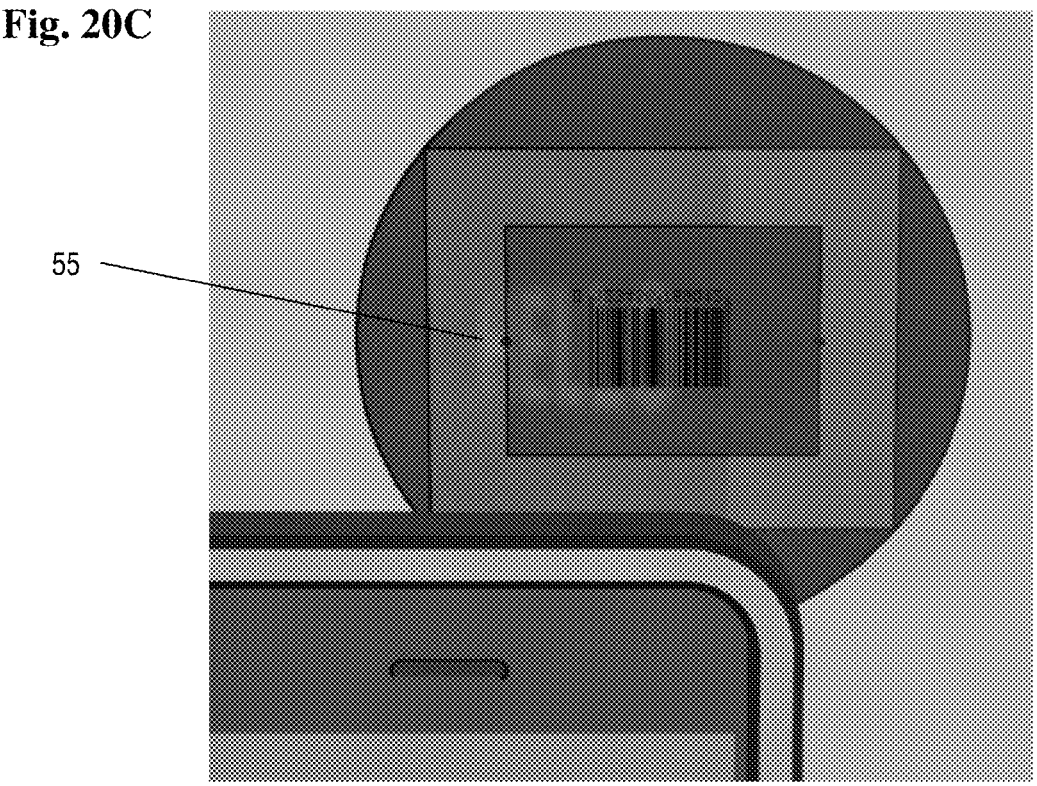

FIG. 20A is a perspective drawing of yet another alternative embodiment of this disclosure. In this embodiment, a pair of mirrors 220, 222 are used to redirect light away from the axis of the optical path of light emitted from lamp 221 and to a target. In particular, mirror 220 changes the direction of the optical path of light emitted from lamp 221 from light axis, L to a first light shifted axis, $L_S$ and directed to mirror 222. Mirror 222 redirects the reflected beam of light to a second light shifted axis, $L_S$ to the target. In this example, the reflective surface of mirror 222 is in the shape of a hand pointing a finger so that the beam of light reflected from mirror 222 to the target includes this image. FIG. 20B depicts the illumination of the barcode target with the image contained in the pattern of light 55, namely collimated light in the shape of a hand pointing a finger. A user may line up the finger of collimated light to an edge of the barcode whereupon the barcode may be captured and processed as explained above. FIG. 20C shows an alternative embodiment of FIG. 20A wherein the reflective surface of mirror 222 is in the shape of the reversed spelling of the word "HELLO" (spelled "OLLEH").

FIG. 21 depicts illustrative embodiments of light pipes that may be used with the aimer accessory 30. Each light pipe redirects the optical path of light from light axis, L to a light shifted axis, $L_S$ as shown wherein the barcode is easily captured and processed.

Figure 22:
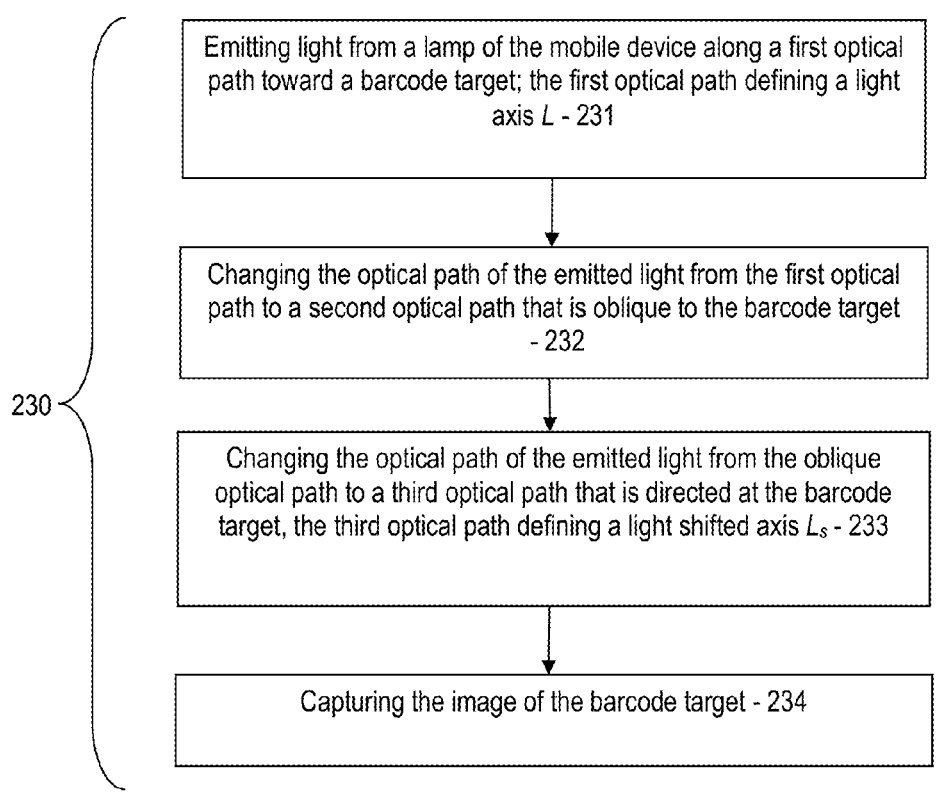
FIG. 22 depicts an illustrative method according to this disclosure for adjusting the decoding position of the software decoder to align with the shape and usage of the light pattern.
Figure 23:
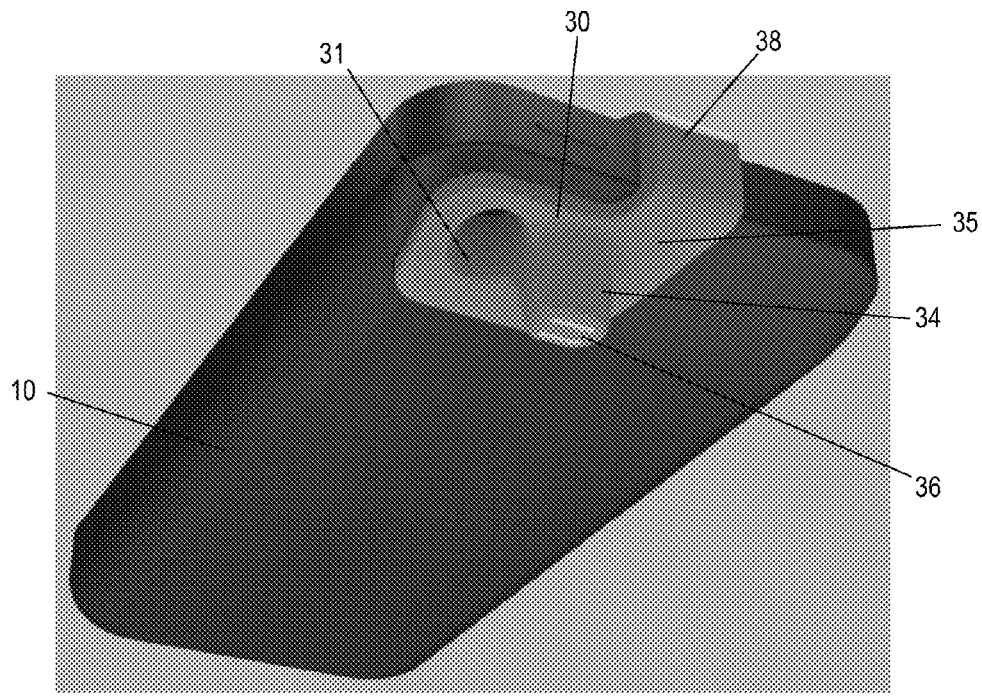
FIGS. 23-26 depict perspective drawings of an illustrative aimer accessory according to this disclosure.
Figure 24:
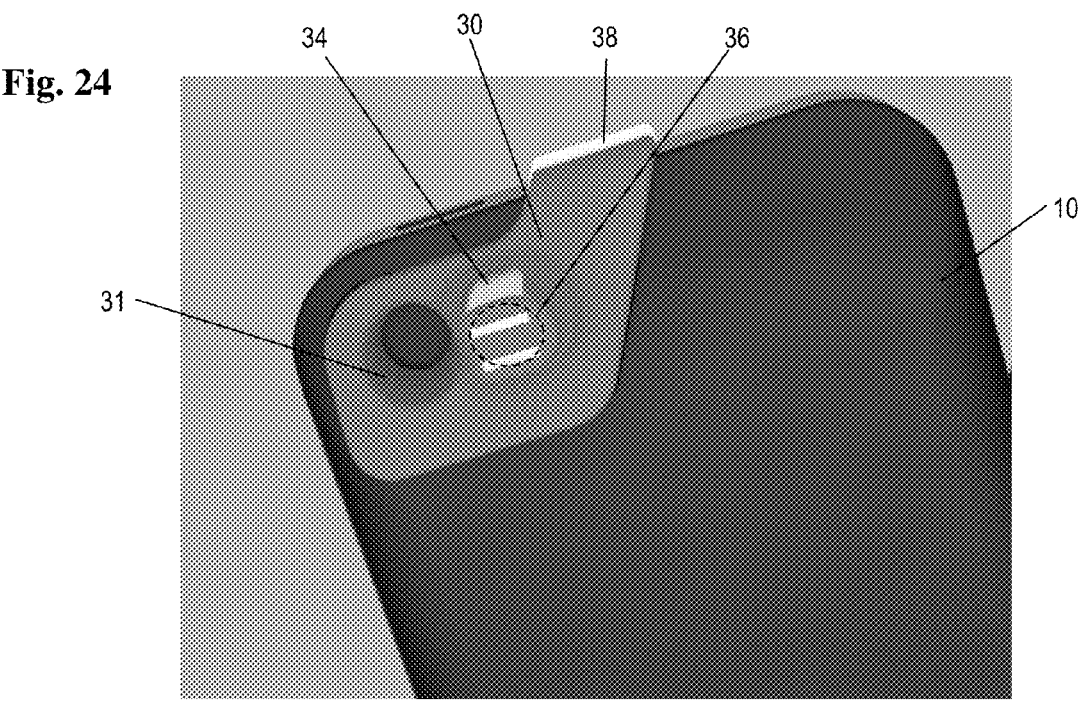
Figure 25:
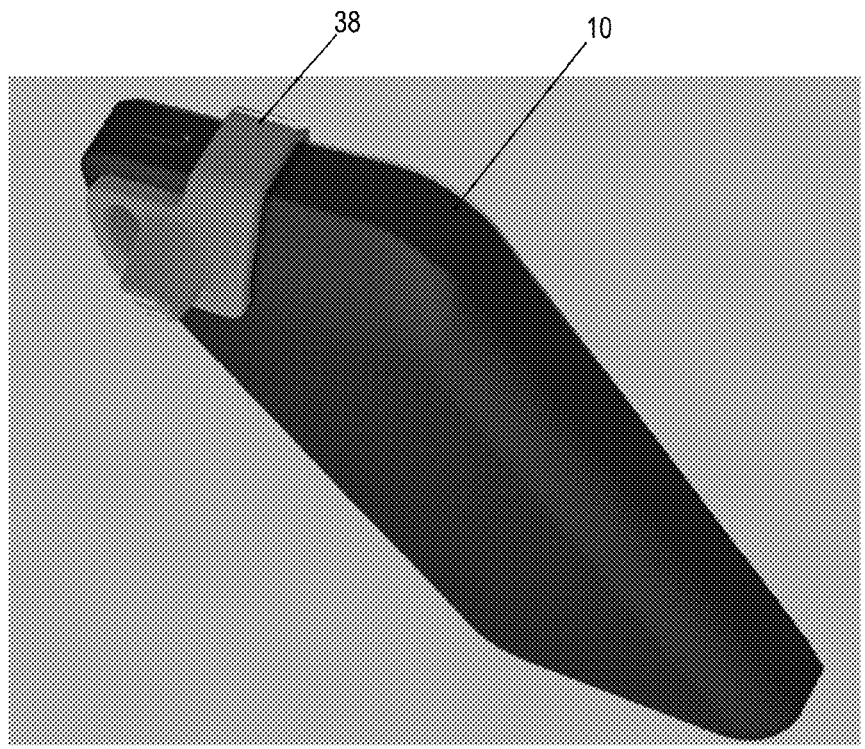
Figure 26:
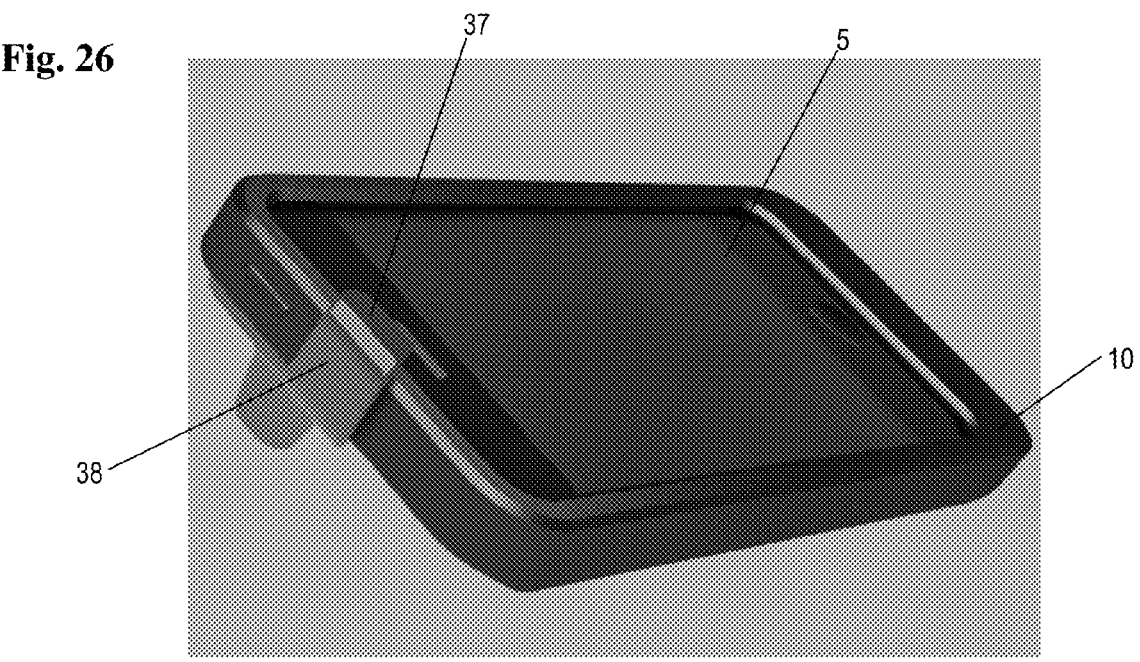

FIG. 22 depicts an illustrative method for aimer scanning 230 (e.g., blind mode blind mode operation, blind mode targeted mode operation, targeted mode blind mode operation, and targeted mode targeted mode operation). According to the method, light is emitted 231 from a lamp of the mobile device along a first optical path toward a barcode target. The first optical path defines a light axis, L. The optical path of the emitted light is then changed 232 from the light axis, L, to a second optical path that is oblique to the barcode target. The optical path of the emitted light is then changed again 233 from the oblique optical path to a third optical path that is directed at the barcode target. The third optical path defines a light shifted axis, $L_S$. Finally, the image of the barcode target is captured 234 by the mobile device.

Referring now to FIGS. 23 through 26, aspects of an additional embodiment of the aimer accessory 30 are shown. In the example shown, the aimer accessory 30 includes a retainer 38. Generally, the retainer 38 provides for coupling of the aimer module body onto the mobile device 10 or to an external protective case surrounding mobile device 10. In the example shown, the retainer 38 includes an arm that extends upward and over the top of the mobile device 10 and terminates with a clip 37 (see FIG. 26) on the front of the mobile device 10. Accordingly, by cooperation of the retainer 38 with the clip 37 and the opposing body 35, this embodiment of the aimer accessory 30 may be effectively clipped onto the mobile device 10. Accordingly, this embodiment of the aimer 30 is referred to as a "clip-on aimer."

In various embodiments, the retainer 38 provides a clamping force to the mobile device 10 or to an external protective case surrounding mobile device 10. In some embodiments, the clamping force is realized by having opposing retainers 38. Opposing retainers 38 may be realized by having one retainer configured for retention on a left side of the mobile device 10 or protective case with the opposing retainer 38 configured for retention on a right side of the mobile device 10 or protective case (not shown). In some embodiments, the retainer 38 includes the detents, nipples, ridges or other features as may be known in the art to assist with retention and registration or alignment with mobile device 10.

In some embodiments, such as the one shown in FIGS. 23 through 26, the clip-on aimer is further stabilized by having portions that conform to the shape of the mobile device 10 or protective case for mobile device 10. For example, the clip-on aimer includes a deep-well collector 31 that conforms to the shape of the mobile device 10 or to the protective case surrounding mobile device 10. Additionally in this embodiment, the clip-on aimer includes a body 35 to conform to curved surfaces of the mobile device 10.

Figure 27:
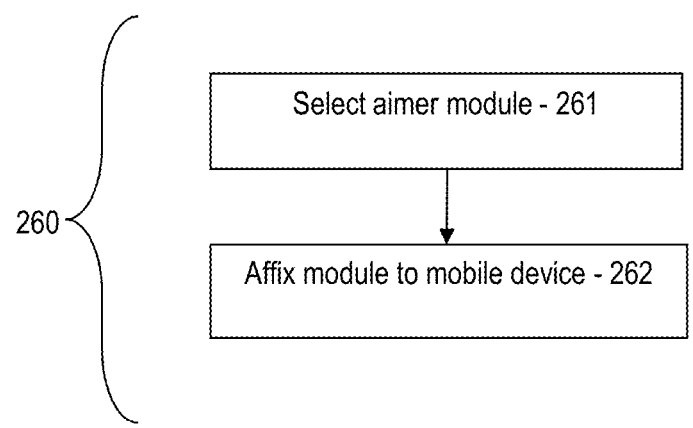
FIG. 27 depicts an illustrative method for retrofit of a mobile device with the aimer accessory of this disclosure.

FIG. 27 depicts an illustrative method for retrofit of a mobile device with the aimer accessory of this disclosure The method for modification of the mobile device 260 includes selecting an aimer accessory 261. The aimer accessory selected may include any one of the aimer accessories as discussed herein, a combination thereof, or an aimer accessory that includes other features than those disclosed herein. After completing the selection of the aimer accessory 261, the user performs affixing of the aimer accessory 262. Affixing of the aimer accessory 262 generally calls for one of temporarily affixing or permanently affixing the aimer accessory to the mobile device 10 or to the protective case surrounding mobile device 10.

There is thus disclosed an aimer module for a mobile device. In an illustrative embodiment, an aimer accessory for a mobile device is provided. The aimer accessory includes a body configured for being affixed to the mobile device. The body includes a collimator terminating with a grating disposed in a distal portion thereof. The grating is configured to receive light from a lamp of the mobile device and to generate a light pattern on the surface containing a barcode. Registration of the light pattern and the barcode in a scan area enhances the ability of the mobile device to capture a barcode image. Registration may be configured for blind mode or target mode scanning. In blind mode scanning, the registration occurs on a detection of the light pattern and the barcode in a viewing angle of a camera of the mobile device. In target mode scanning, the registration occurs on a detection of the light pattern hovering over the barcode in a viewing angle of a camera of the mobile device.

The accessory may further include an optical element for receiving light from the lamp and providing the light to the grating. The optical element may include at least one of a lens, a reflective surface, a light pipe and an optical fiber. The accessory may further include a collector configured for collecting light incident upon the camera. The grating may include at least one of a pair of substantially parallel slits and a substantially rectangular array of holes.

The accessory may be configured to offset light from the lamp away from the camera. The offset may be configured to extend an optical range for reading the barcode. The accessory may be configured as one of a simple offset aimer, a basic aimer, an elongated offset aimer, a standard offset aimer, a tube offset aimer, and a fitted aimer.

The body of the accessory may further include a retainer for retaining the accessory on the mobile device. The retainer may terminate in a clip. The accessory may be configured as a clip-on accessory.

The accessory may be configured for reading a barcode including a format that is one of: Codabar; Code 25, non-interleaved 2 of 5; Code 25 interleaved 2 of 5; Code 11; Code 39; Code 93; Code 128; CPC Binary; DUN 14; EAN 2; EAN 5; EAN-8, EAN-13; Facing Identification Mark; GS1-128; GS1 DataBar; HIBC; Intelligent Mail barcode; ITF-14; JAN; KarTrak ACI; Latent image barcode; MSI;

Pharmacode; PLANET; Plessey; PostBar; POSTNET; RM4SCC/KIX; Telepen; and, U.P.C.

The accessory may be configured for reading a barcode comprising a format that is one of: Aztec Code; Code 1; ColorCode; Color Construct Code; CrontoSign; CyberCode; d-touch; DataGlyphs; DataGlyphs; Data Matrix; Datastrip Code; digital paper; EZcode; High Capacity Color; High Capacity Color Barcode; HueCode; InterCode; MaxiCode; MMCC; NexCode; Nintendo e-Reader#Dot code; PDF417; Qode; QR code; ShotCode; and, SPARQCode. The accessory may be configured for reading a barcode comprising a plurality of colors.

In another illustrative embodiment, a mobile device configured for either blind or targeted scanning of a barcode is provided. The mobile device includes a body configured for being clipped onto the mobile device. The body includes a collimator terminating with a grating disposed in a distal portion thereof. The grating is configured to receive light from a lamp of the mobile device and to generate a light pattern on the surface containing the barcode. Registration of the light pattern and the barcode in a scan area enhances the ability of the mobile device to capture a barcode image. Registration may be configured for blind mode or target mode scanning. In blind mode scanning, the registration occurs on a detection of the light pattern and the barcode in a viewing angle of a camera of the mobile device. In target mode scanning, the registration occurs on a detection of the light pattern hovering over the barcode in a viewing angle of a camera of the mobile device.

The mobile device may include one of a smart phone, a tablet computer and a special purpose device. The either blind or targeted scanning enables reliable readout of the barcode without use of a display. The light pattern may include at least one of substantially parallel lines, an array of dots, and a set of crosshairs.

In another illustrative embodiment, a method for configuring a mobile device for scanning a barcode is provided. The method includes selecting an aimer accessory for the mobile device. The aimer accessory includes a body configured for being affixed to the mobile device. The body includes a collimator terminating with a grating disposed in a distal portion thereof. The grating is configured to receive light from a lamp of the mobile device and to generate a light pattern on the surface containing a barcode. Registration of the light pattern and the barcode in a scan area enhances the ability of the mobile device to capture a barcode image. The aimer accessory is affixed to the mobile device. The method may further include detecting the light pattern and the barcode in a viewing angle of a camera of the mobile device and capturing the image of the barcode target. The method may further include detecting the light pattern as hovering over the barcode in a viewing angle of a camera of the mobile device and capturing the image of the barcode target.

The aimer accessory and the code reader application may be employed on a variety of mobile devices. Generally, it is only required that the mobile device include a camera, a lamp, and appropriate components for operation thereof. Examples of other mobile devices include tablet computers, as well as special purpose devices such as handheld units used for taking field inventory of assets, a dedicated barcode reader, and other such devices.

The grating may generate a variety of light patterns. For example, a set of dots, a single line, a square or rectangle, and crosshairs may be used. Combinations of slits and holes may be used. A variety of orientations may be provided, and geometric patterns may be used as well. In some embodiments, the grating is configured with regard for a particular type, or symbology, of barcode that will be read. For example, a substantially rectangular array of holes may be useful for registration with a substantially rectangular barcode, such as a PDF417 barcode.

In addition, a variety of techniques may be employed for barcode recognition. Use of horizontal bars, parallel lines, dots, crosshairs, and other such aiming patterns may be used to assist with barcode recognition.

An appropriately equipped aimer accessory may provide for re-concentrating light that would otherwise be dispersed.

Software may be downloaded onto or provided with the mobile device of this disclosure that produces a software-produced button on the display of the mobile device. In addition, initiation or triggering of a scan by the mobile device may be performed by programmatically re-mapping of one of the mobile device buttons for such use, or triggered externally using Wi-Fi, NFC, or other technology.

The software may further provide user feedback on "good" or "bad" images, or decode of a symbology, via user prompts such as an audible sound from the mobile device, a vibration from the mobile device, an activity on the display, such as blinking of the screen, a color change, a movement of an image displayed, etc. Additionally, the feedback may be wirelessly transmitted to a remote location for action, recording, etc.

The aimer module and accessory of this disclosure may further assist in battery conservation and power management since images may be captured more efficiently according to this disclosure.

Various other components may be included and called upon for providing for aspects of the teachings herein. For example, additional materials, combinations of materials, and/or omission of materials may be used to provide for added embodiments that are within the scope of the teachings herein.

Standards for performance, selection of materials, functionality, and other discretionary aspects are to be determined by a user, designer, manufacturer, or other similarly interested party. Any standards expressed herein are merely illustrative and are not limiting of the teachings herein.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the invention has been described with reference to illustrative embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An aimer accessory for a mobile device, the aimer accessory comprising:
   a body configured for being affixed to the mobile device, the body comprising a collimator terminating with a grating disposed in a distal portion thereof, the grating configured to receive light from a lamp of the mobile device, and to generate a light pattern on a surface containing a barcode;

wherein registration of the light pattern and the barcode in a scan area precedes capture of a barcode image by the mobile device and enhances the ability of the mobile device to capture the barcode image;

wherein the aimer accessory is configured to operate, selectively, in blind mode scanning and in targeted mode scanning;

wherein the registration occurs, in the blind mode scanning, on a detection of the light pattern and the barcode in a viewing angle of a camera of the mobile device; and wherein the registration occurs, in the targeted mode scanning, on a detection of the light pattern hovering over the barcode in the viewing angle of the camera of the mobile device.

2. The accessory as in claim 1, further comprising an optical element for receiving light from the lamp and providing the light to the grating.

3. The accessory as in claim 2, wherein the optical element comprises at least one of a lens, a reflective surface, a light pipe and an optical fiber.

4. The accessory as in claim 1, further comprising a collector configured for collecting light incident upon the camera.

5. The accessory as in claim 1, wherein the grating comprises at least one of a pair of substantially parallel slits and a substantially rectangular array of holes.

6. The accessory as in claim 1, configured to offset light from the lamp away from the camera.

7. The accessory as in claim 6, wherein the offset is configured to extend an optical range for reading the barcode.

8. The accessory as in claim 1, configured as one of a simple offset aimer, a basic aimer, an elongated offset aimer, a standard offset aimer, a tube offset aimer, and a fitted aimer.

9. The accessory as in claim 1, wherein the body further comprises a retainer for retaining the accessory on the mobile device.

10. The accessory as in claim 9, wherein the retainer terminates in a clip.

11. The accessory as in claim 1, configured as a clip-on accessory.

12. The accessory as in claim 1, wherein the barcode comprises a plurality of colors.

13. The accessory of claim 1, wherein the mobile device is configured to automatically initiate the capture of the barcode image after the registration occurs.

14. A mobile device configured for scanning of a barcode on a surface, the mobile device comprising:
a body configured for being clipped onto the mobile device, the body comprising a collimator terminating with a grating disposed in a distal portion thereof, the grating configured to receive light from a lamp of the mobile device, and to generate a light pattern on the surface containing the barcode;

wherein registration of the light pattern and the barcode in a scan area triggers capture of a barcode image by the mobile device and enhances the ability of the mobile device to capture the barcode image;

wherein the body and the mobile device is configured to operate for scanning the barcode, selectively, in blind mode scanning and in targeted mode scanning;

wherein the registration occurs, in the blind mode scanning, on a detection of the light pattern and the barcode in a viewing angle of a camera of the mobile device; and wherein the registration occurs, in the targeted mode scanning, on a detection of the light pattern hovering over the barcode in the viewing angle of the camera of the mobile device.

15. The mobile device as in claim 14, wherein the mobile device comprises one of a smart phone, a tablet computer and a special purpose device.

16. The mobile device as in claim 14, wherein at least one of the blind mode scanning and the targeted mode scanning enables reliable readout of the barcode without use of a display.

17. The mobile device as in claim 14, wherein the light pattern comprises at least one of substantially parallel lines, an array of dots, and a set of crosshairs.

18. The mobile device of claim 14, wherein the mobile device is configured to automatically initiate the capture of the barcode image after the registration occurs.

19. A method for configuring a mobile device for scanning a barcode on a surface, the method comprising:
selecting an aimer accessory for the mobile device, the aimer accessory comprising a body configured for being affixed to the mobile device, the body comprising a collimator terminating with a grating disposed in a distal portion thereof, the grating configured to receive light from a lamp of the mobile device, and to generate a light pattern on the surface containing a barcode, wherein registration of the light pattern and the barcode in a scan area precedes capture of a barcode image by the mobile device and enhances the ability of the mobile device to capture the barcode image;

affixing the aimer accessory to the mobile device; and
capturing the barcode image;

wherein the mobile device and the aimer accessory are configured for scanning the barcode, selectively, in blind mode scanning and in targeted mode scanning;

wherein the registration occurs, in the blind mode scanning, on a detection of the light pattern and the barcode in a viewing angle of a camera of the mobile device; and wherein the registration occurs, in the targeted mode scanning, on a detection of the light pattern hovering over the barcode in the viewing angle of the camera of the mobile device.

20. The method of claim 19, wherein the mobile device is configured to automatically initiate the capture of the barcode image after the registration occurs.

* * * * *